(12) United States Patent
Hori et al.

(10) Patent No.: US 11,043,784 B2
(45) Date of Patent: Jun. 22, 2021

(54) LASER APPARATUS AND EUV LIGHT GENERATION SYSTEM

(71) Applicant: Gigaphoton Inc., Tochigi (JP)

(72) Inventors: Tsukasa Hori, Oyama (JP); Yoshifumi Ueno, Oyama (JP); Takayuki Yabu, Oyama (JP); Yoshiaki Kurosawa, Oyama (JP)

(73) Assignee: Gigaphoton Inc., Tochigi (JP)

( * ) Notice: Subject to any disclaimer, the term of this patent is extended or adjusted under 35 U.S.C. 154(b) by 31 days.

(21) Appl. No.: 16/595,782

(22) Filed: Oct. 8, 2019

(65) Prior Publication Data

US 2020/0044407 A1    Feb. 6, 2020

Related U.S. Application Data

(63) Continuation of application No. PCT/JP2017/020223, filed on May 31, 2017.

(51) Int. Cl.
  *H01S 3/04* (2006.01)
  *H01S 3/23* (2006.01)
  *H05G 2/00* (2006.01)

(52) U.S. Cl.
  CPC .......... *H01S 3/0404* (2013.01); *H01S 3/2316* (2013.01); *H05G 2/008* (2013.01)

(58) Field of Classification Search
  CPC ...... H01S 3/0404; H01S 3/2316; H05G 2/008
  USPC ......................................... 372/34; 250/504 R
  See application file for complete search history.

(56) References Cited

U.S. PATENT DOCUMENTS

| 10,128,017 B1* | 11/2018 | Ershov ............... G03F 7/70916 |
| 2010/0078580 A1* | 4/2010 | Endo ...................... H05G 2/003 |
| | | 250/504 R |
| 2016/0316551 A1 | 10/2016 | Kurosawa |
| 2016/0336713 A1 | 11/2016 | Nogiwa et al. |

FOREIGN PATENT DOCUMENTS

| JP | H11-156571 A | 6/1999 |
| JP | 2011-240361 A | 12/2011 |
| WO | 2015/118687 A1 | 8/2015 |
| WO | 2015/128943 A1 | 9/2015 |

OTHER PUBLICATIONS

International Search Report issued in PCT/JP2017/020223; dated Aug. 15, 2017.
International Preliminary Report on Patentability and Written Opinion issued in PCT/JP2017/020223; dated Dec. 3, 2019.

* cited by examiner

*Primary Examiner* — Jason L McCormack
(74) *Attorney, Agent, or Firm* — Studebaker & Brackett PC

(57) ABSTRACT

A laser apparatus includes: a plurality of envelope blocks each provided with an optical element and a first temperature sensor and covering part of a laser beam path, the optical element being disposed on the laser beam path, the first temperature sensor being configured to measure a first temperature of gas at a position away from the optical element; an envelope body including the envelope blocks and covering the laser beam path; and a control unit connected with each first temperature sensor and configured to specify an envelope block at which increase of the first temperature is measured in the envelope body as an envelope block at which anomaly is occurring.

15 Claims, 13 Drawing Sheets

LASER APPARATUS AND EUV LIGHT GENERATION SYSTEM

CROSS-REFERENCE TO RELATED APPLICATIONS

The present application is a continuation application of International Application No. PCT/JP2017/020223 filed on May 31, 2017. The content of the application is incorporated herein by reference in its entirety.

BACKGROUND

1. Technical Field

The present disclosure relates to a laser apparatus and an EUV light generation system.

2. Related Art

Recently, miniaturization of a transfer pattern in optical lithography of a semiconductor process has been rapidly proceeding along with miniaturization of the semiconductor process. Minute fabrication at 20 nm or smaller will be requested in the next generation technology. To meet the request for minute fabrication at 20 nm or smaller, for example, it is desired to develop an exposure apparatus including an extreme ultraviolet light generation device configured to generate extreme ultraviolet (EUV) light at a wavelength of 13 nm approximately in combination with reduced projection reflective optics.

Disclosed EUV light generation devices include the three kinds of devices of a laser produced plasma (LPP) device that uses plasma generated by irradiating a target material with a laser beam, a discharge produced plasma (DPP) device that uses plasma generated by electrical discharge, and a synchrotron radiation (SR) device that uses orbital radiation light.

LIST OF DOCUMENTS

Patent Documents

Patent Document 1: Japanese Unexamined Patent Application Publication No. 11-156571
Patent Document 2: Japanese Unexamined Patent Application Publication No. 2011-240361

SUMMARY

A first laser apparatus of the present disclosure includes: a plurality of envelope blocks each provided with an optical element and a first temperature sensor and covering part of a laser beam path, the optical element being disposed on the laser beam path, the first temperature sensor being configured to measure a first temperature of gas at a position away from the optical element; an envelope body including the envelope blocks and covering the laser beam path; and a control unit connected with each first temperature sensor and configured to specify an envelope block at which increase of the first temperature is measured in the envelope body as an envelope block at which anomaly is occurring.

A second laser apparatus of the present disclosure includes: an optical element disposed on a laser beam path; a plurality of optical path tubes each covering the optical element and including an intake unit configured to introduce purge gas to inside of the optical path tube, a discharge unit configured to discharge the purge gas from inside of the optical path tube, and a first temperature sensor configured to measure a first temperature of the purge gas discharged from the discharge unit; an envelope body covering the laser beam path with the optical path tubes; and a control unit connected with each first temperature sensor and configured to specify an optical path tube in which increase of the first temperature is measured in the envelope body as an optical path tube in which anomaly is occurring.

A first EUV light generation system of the present disclosure includes: an EUV chamber in which EUV light is generated; and a laser apparatus configured to emit a laser beam toward the EUV chamber. The laser apparatus includes: a plurality of envelope blocks each provided with an optical element and a first temperature sensor and covering part of a laser beam path, the optical element being disposed on the laser beam path, the first temperature sensor being configured to measure a first temperature of gas at a position away from the optical element; an envelope body including the envelope blocks and covering the laser beam path; and a control unit connected with each first temperature sensor and configured to specify an envelope block at which increase of the first temperature is measured in the envelope body as an envelope block at which anomaly is occurring.

A second EUV light generation system of the present disclosure includes: an EUV chamber in which EUV light is generated; and a laser apparatus configured to emit a laser beam toward the EUV chamber. The laser apparatus includes: an optical element disposed on a laser beam path; a plurality of optical path tubes each covering the optical element and including an intake unit configured to introduce purge gas to inside of the optical path tube, a discharge unit configured to discharge the purge gas from inside of the optical path tube, and a first temperature sensor configured to measure a first temperature of the purge gas discharged from the discharge unit; an envelope body covering the laser beam path with the optical path tubes; and a control unit connected with each first temperature sensor and configured to specify an optical path tube in which increase of the first temperature is measured in the envelope body as an optical path tube in which anomaly is occurring.

BRIEF DESCRIPTION OF THE DRAWINGS

Embodiments of the present disclosure will be described below as examples with reference to the accompanying drawings.

DESCRIPTION OF EMBODIMENTS

<Contents>
<1. Overall description of EUV light generation device>
(FIG. 1)
1.1 Configuration
1.2 Operation
<2. Comparative example> (EUV light generation system having function of sensing anomalous heating) (FIGS. 2 and 3)
2.1 EUV light generation system according to comparative example
2.1.1 Configuration
2.1.2 Operation
2.2 Laser apparatus according to comparative example
2.2.1 Configuration
2.2.2 Operation
2.3 Problem
<3. Embodiment 1> (laser apparatus having function of measuring discharge temperature of purge gas) (FIGS. 4 to 7)
3.1 Configuration
3.2 Operation
3.3 Effect
3.4 Modification
<4. Embodiment 2> (laser apparatus having function of measuring temperature of purge gas supplied from gas supply device) (FIG. 8)
4.1 Configuration
4.2 Operation
4.3 Effect
<5. Embodiment 3> (laser apparatus having function of measuring intake temperature of purge gas) (FIGS. 9 to 11)
5.1 Configuration
5.2 Operation
5.3 Effect
<6. Embodiment 4> (laser apparatus having function of measuring discharge temperature of purge gas at optical path tube gap) (FIG. 12)
6.1 Configuration
6.2 Operation
6.3 Effect
<7. Embodiment 5> (laser apparatus having function of measuring temperature of purge gas inside optical path tube) (FIG. 13)
7.1 Configuration
7.2 Operation and effect
<8. Others>

Embodiments of the present disclosure will be described below in detail with reference to the accompanying drawings. The embodiments described below are examples of the present disclosure, and do not limit the contents of the present disclosure. Not all configurations and operations described in each embodiment are necessarily essential as configurations and operations of the present disclosure. Components identical to each other are denoted by an identical reference sign, and duplicate description thereof will be omitted.

1. Overall Description of EUV Light Generation Device

[1.1 Configuration]

Figure 1:
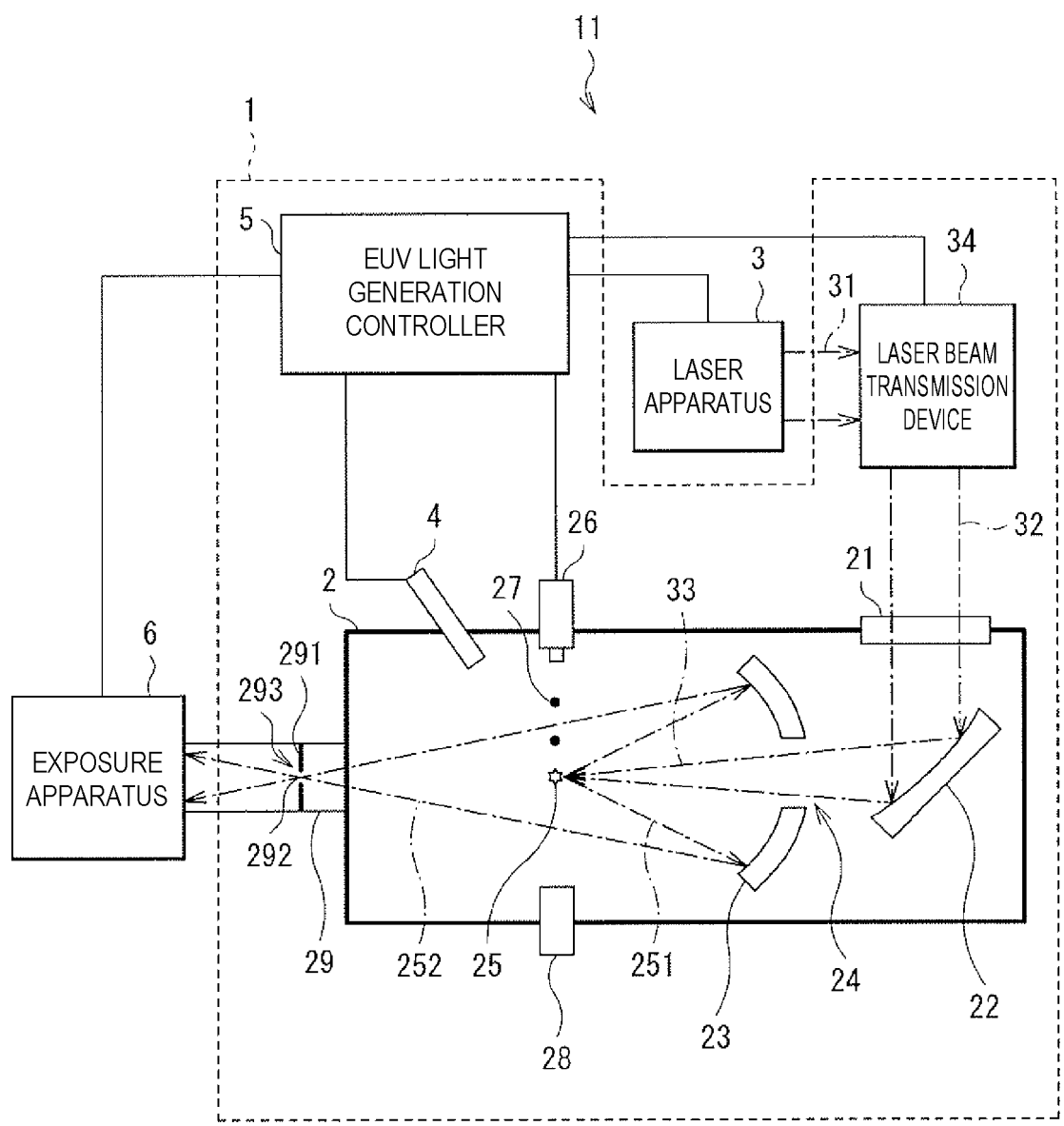
FIG. 1 schematically illustrates an exemplary configuration of an exemplary LPP EUV light generation system.

FIG. 1 schematically illustrates the configuration of an exemplary LPP EUV light generation system. This EUV light generation device 1 is used together with at least one laser apparatus 3 in some cases. In the present application, a system including the EUV light generation device 1 and the laser apparatus 3 is referred to as an EUV light generation system 11. As illustrated in FIG. 1 and described below in detail, the EUV light generation device 1 includes a chamber 2 and a target supply unit 26. The chamber 2 is a sealable container. The target supply unit 26 supplies a target substance into the chamber 2, and is, for example, attached to penetrate through a wall of the chamber 2. The material of the target substance may contain tin, terbium, gadolinium, lithium, xenon, or a combination of two or more thereof, but is not limited thereto.

The wall of the chamber 2 is provided with at least one through-hole. The through-hole is blocked by a window 21 through which a pulse laser beam 32 output from the laser apparatus 3 transmits. For example, an EUV light focusing mirror 23 having a rotating spheroidal surface is disposed inside the chamber 2. The EUV light focusing mirror 23 has first and second focuses. For example, a multi-layer reflective film obtained by alternately stacking molybdenum and silicon is formed on the surface of the EUV light focusing mirror 23. The EUV light focusing mirror 23 may be disposed so that, for example, the first focus is positioned in a plasma generating region 25 and the second focus is positioned at an intermediate focal point (IF) 292. The EUV light focusing mirror 23 is provided with a through-hole 24 at a central part thereof through which a pulse laser beam 33 passes.

The EUV light generation device 1 includes an EUV light generation controller 5, a target sensor 4, and the like. The target sensor 4 detects one or a plurality of the existence, locus, position, and speed of a target 27. The target sensor 4 may have an image capturing function.

The EUV light generation device 1 includes a connection unit 29 through which the inside of the chamber 2 and the inside of an exposure apparatus 6 are communicated with each other. A wall 291 on which an aperture 293 is formed is provided inside the connection unit 29. The wall 291 is disposed so that the aperture 293 is positioned at the second focus of the EUV light focusing mirror 23.

In addition, the EUV light generation device 1 includes a laser beam transmission device 34, a laser beam focusing mirror 22, a target recovery unit 28 for collecting the target 27, and the like. The laser beam transmission device 34 includes an optical element for defining the transmission state of a laser beam, and an actuator for adjusting the position, posture, and the like of the optical element.

[1.2 Operation]

The following describes operation of the exemplary LPP EUV light generation system with reference to FIG. 1. A pulse laser beam 31 output from the laser apparatus 3 passes through the laser beam transmission device 34 and is incident in the chamber 2 through the window 21 as the pulse laser beam 32. The pulse laser beam 32 travels inside the chamber 2 along at least one laser beam path, and is reflected by the laser beam focusing mirror 22 and incident on the at least one target 27 as the pulse laser beam 33.

The target supply unit 26 outputs the target 27 formed of the target substance toward the plasma generating region 25 in the chamber 2. The target 27 is irradiated with at least one pulse included in the pulse laser beam 33. Plasma is generated when the target 27 is irradiated with the pulse laser beam, and radiates radiation light 251. EUV light 252 included in the radiation light 251 is selectively reflected by the EUV light focusing mirror 23. The EUV light 252 reflected by the EUV light focusing mirror 23 is condensed at an intermediate focal point 292 and output to the exposure apparatus 6. The single target 27 may be irradiated with a plurality of pulses included in the pulse laser beam 33.

The EUV light generation controller 5 collectively controls the entire EUV light generation system 11. The EUV light generation controller 5 processes a result of detection by the target sensor 4. The EUV light generation controller 5 may control, based on the result of the detection by the target sensor 4, for example, a timing at which the target 27 is output, a direction in which the target 27 is output, and the like. In addition, the EUV light generation controller 5 may control, for example, the oscillation timing of the laser apparatus 3, the traveling direction of the pulse laser beam 32, the focusing position of the pulse laser beam 33, and the like. These various kinds of control are merely exemplary, and may include other control as necessary.

2. Comparative Example

EUV Light Generation System Having Function of Sensing Anomalous Heating

[2.1 EUV Light Generation System According to Comparative Example]

[2.1.1 Configuration]

Figure 2:
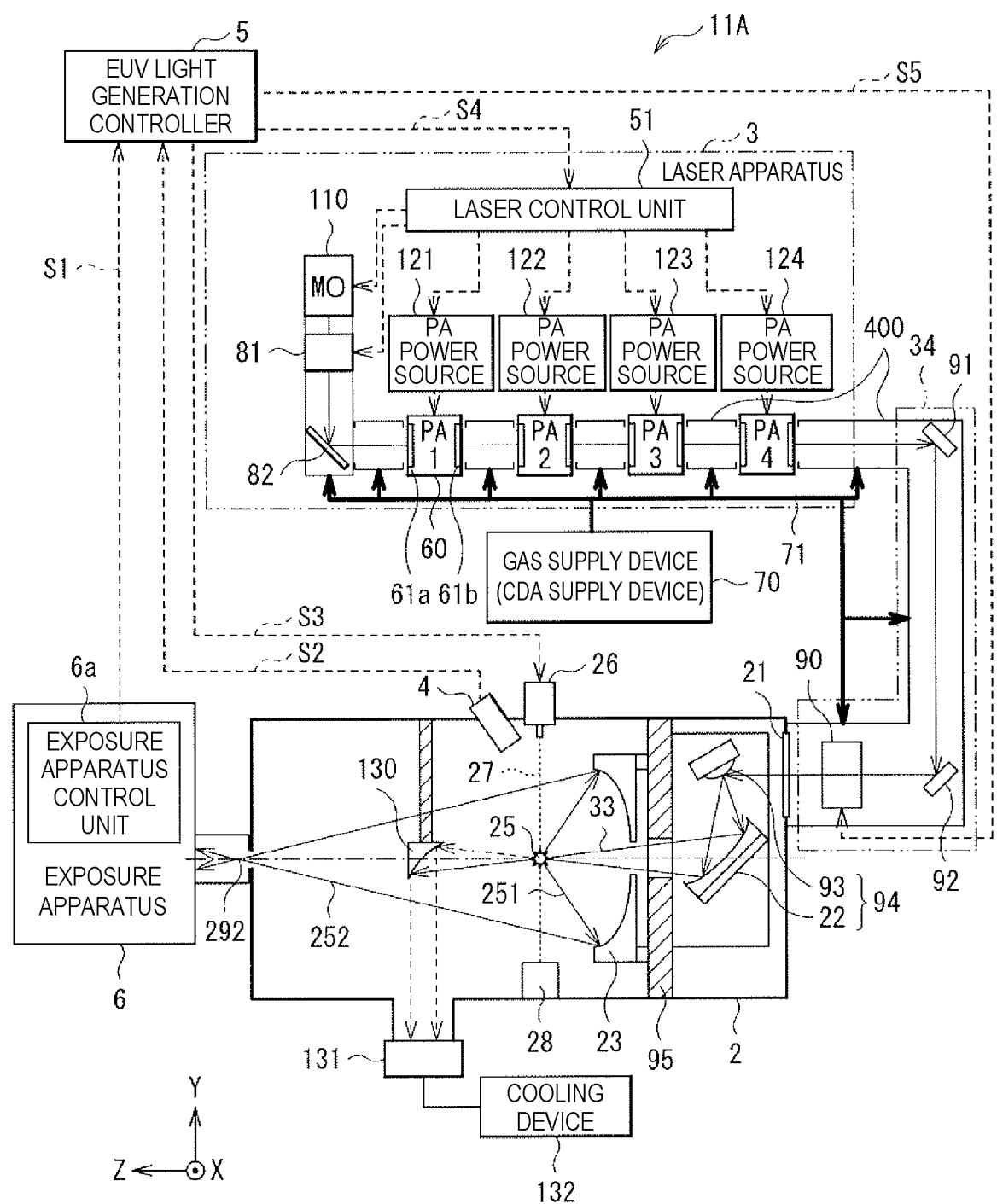
FIG. 2 schematically illustrates an exemplary configuration of an EUV light generation system according to a comparative example.

FIG. 2 schematically illustrates an exemplary configuration of an EUV light generation system 11A according to a comparative example. Hereinafter, any component substantially identical to that of the EUV light generation system 11 illustrated in FIG. 1 is denoted by an identical reference sign, and description thereof will be omitted as appropriate.

The EUV light generation system 11A may include the chamber 2, the laser apparatus 3, the laser beam transmission device 34, and the EUV light generation controller 5.

The laser apparatus 3 may include a master oscillator (MO) 110, an optical isolator 81, a high reflection mirror 82, a plurality of amplifiers PA1, PA2, PA3, and PA4, a plurality of PA power sources 121, 122, 123, and 124, and a laser control unit 51.

The laser control unit 51 is connected with the EUV light generation controller 5.

The laser apparatus 3 may also include a plurality of optical elements provided on a laser beam path. The optical elements provided on the laser beam path may include another optical element (not illustrated) in addition to the optical isolator 81 and the high reflection mirror 82. The optical elements may perform at least one of laser beam transmission and laser beam shaping.

The master oscillator 110 and the amplifiers PA1, PA2, PA3, and PA4 may form a master oscillator power amplifier (MOPA). The amplifiers PA1, PA2, PA3, and PA4 may be disposed on the path of a laser beam output from the master oscillator 110 through the optical isolator 81 and the high reflection mirror 82. The amplifiers PA1, PA2, PA3, and PA4 may be connected with the PA power sources 121, 122, 123, and 124, respectively. The amplifiers PA1, PA2, PA3, and PA4 may each include a laser chamber 60 configured to amplify a laser beam, an input window 61a through which the laser beam is input, and an output window 61b through which the laser beam is output. The laser chamber 60 may include an electrical discharging internal electrode.

The PA power sources 121, 122, 123, and 124 are each connected with the laser control unit 51.

The optical isolator 81 may be disposed on a laser beam path from the master oscillator 110 to the amplifier PA1. The optical isolator 81 may open or close in response to an instruction from the laser control unit 51, thereby transmitting or cutting off a laser beam.

The laser beam transmission device 34 includes a transmission optical system disposed on a path between the laser apparatus 3 and the chamber 2. The transmission optical system may include a plurality of high reflection mirrors 91 and 92 and a beam adjustment device 90.

The chamber 2 may include the target sensor 4, the window 21, an EUV light focusing mirror 23, the target supply unit 26, the target recovery unit 28, a laser beam focusing optical system 94, a mirror holder 95, a damper mirror 130, and a beam dump device 131.

The beam adjustment device 90 may be disposed on a laser beam path from the laser beam transmission device 34 to the laser beam focusing optical system 94. The beam adjustment device 90 may adjust the divergence angle of a laser beam in accordance with an instruction of a divergence angle control signal S5 from the laser control unit 51.

A laser beam path from the master oscillator 110 to the chamber 2 may be substantially entirely covered by a plurality of optical path tubes 400. The optical path tubes 400 may cover part or the entire of each optical element included in the laser beam path. The optical path tubes 400 may be connected with a gas supply device 70 through a gas supply path 71. The gas supply device 70 may supply purge gas into the optical path tubes 400 through the gas supply path 71.

The laser beam focusing optical system 94 may condense the pulse laser beam 33 incident on the chamber 2 to the plasma generating region 25. The laser beam focusing optical system 94 may include a laser beam focusing mirror 22 and a convex mirror 93.

The mirror holder 95 may be fixed to the chamber 2 and hold the EUV light focusing mirror 23 and the laser beam focusing optical system 94. The EUV light focusing mirror 23 may be held through an appropriate holder.

The damper mirror 130 may be disposed on a laser beam path downstream of the plasma generating region 25 to reflect, toward the beam dump device 131, the pulse laser beam 33 having passed through the plasma generating region 25.

The beam dump device 131 may be disposed at a position at which the pulse laser beam 33 reflected by the damper mirror 130 is incident. The pulse laser beam 33 may be incident on the beam dump device 131 disposed on a chamber wall. The beam dump device 131 may be connected with a cooling device 132.

[2.1.2 Operation]

The EUV light generation system 11A may output the EUV light 252 based on an EUV light output command signal S1 from an exposure apparatus control unit 6a of the exposure apparatus 6. The EUV light generation controller 5 may transmit a target output signal S3 to the target supply unit 26 based on the EUV light output command signal S1, and cause the target supply unit 26 to output the target 27.

The target sensor 4 may detect the target 27 and output a target detection signal S2 to the EUV light generation controller 5.

The EUV light generation controller 5 may output a light emission trigger signal S4 generated behind the target detection signal S2 by a predetermined delay time to the laser control unit 51 of the laser apparatus 3.

Having received the light emission trigger signal S4, the laser control unit 51 can output a laser output signal to the master oscillator 110. Before this, the laser control unit 51 may turn on the PA power sources 121, 122, 123, and 124. Accordingly, the PA power sources 121, 122, 123, and 124 may supply voltage or current to the internal electrodes of the respective amplifiers PA1, PA2, PA3, and PA4 so that the amplifiers PA1, PA2, PA3, and PA4 become ready to perform amplification.

The master oscillator 110 can output a pulse laser beam in synchronization with the laser output signal from the laser control unit 51. In synchronization with the above, the laser control unit 51 may open the optical isolator 81. A pulse laser beam output from the master oscillator 110 can be amplified by the amplifiers PA1, PA2, PA3, and PA4 and incident on the beam adjustment device 90 through the laser beam transmission device 34. The beam adjustment device 90 may adjust the divergence angle of the incident pulse laser beam and output the pulse laser beam. The pulse laser beam output from the beam adjustment device 90 can pass through the window 21 and then be input to the chamber 2. The pulse laser beam output from the laser apparatus 3 reaches several kW to several tens kW.

The pulse laser beam input to the chamber 2 is condensed and incident, through the laser beam focusing optical system 94, on the target 27 having reached the plasma generating region 25. Accordingly, the radiation light 251 including the EUV light 252 can be obtained. In this case, the irradiation diameter of the pulse laser beam may be larger than the diameter of the target 27. Part of the pulse laser beam 33 may be incident on the damper mirror 130 instead of the target 27.

The pulse laser beam 33 reflected by the damper mirror 130 is absorbed by the beam dump device 131 and converted into heat. The heat thus generated is discharged to the outside by the cooling device 132.

[2.2 Laser Apparatus According to the Comparative Example]

[2.2.1 Configuration]

Figure 3:
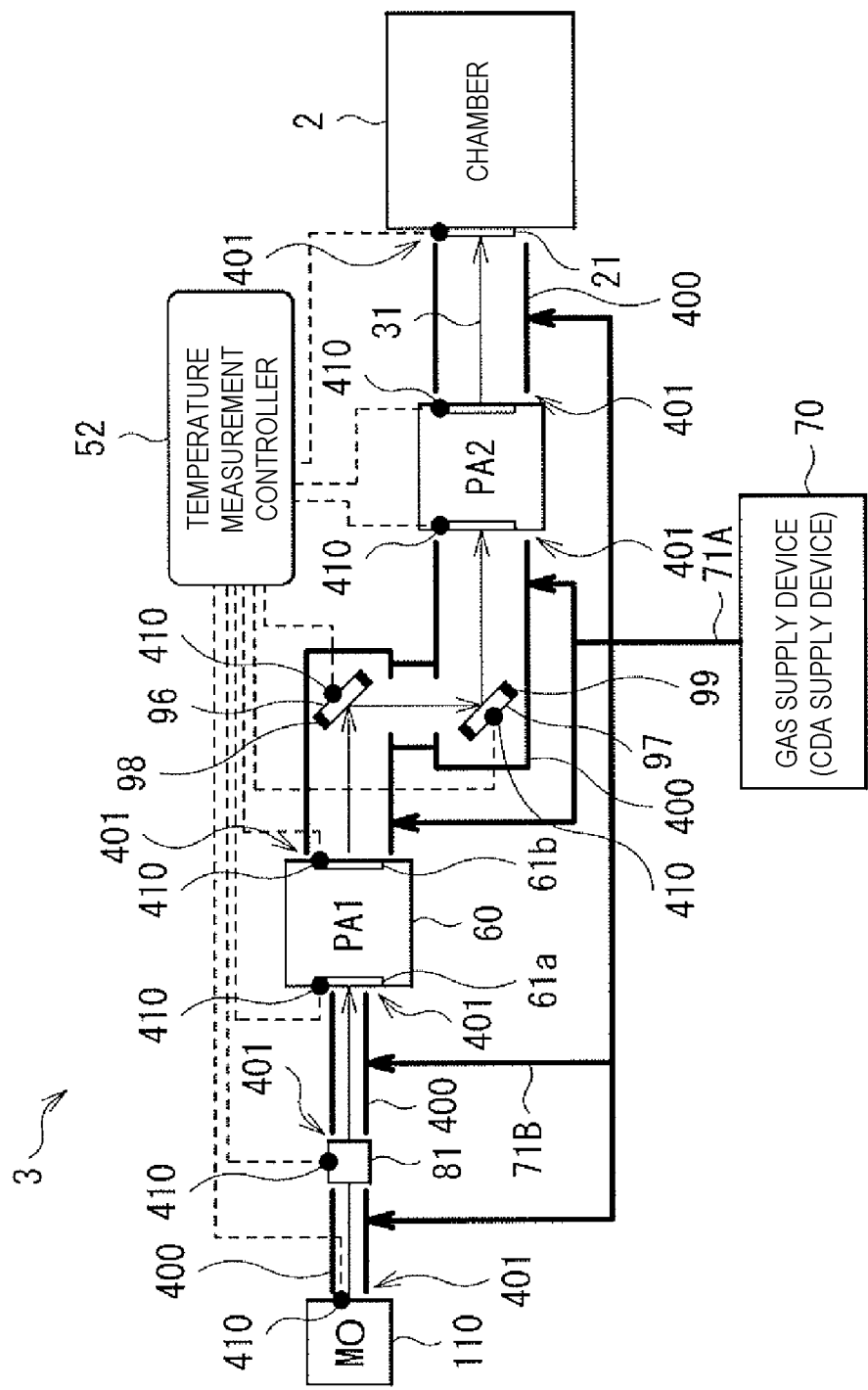
FIG. 3 schematically illustrates an exemplary configuration of a main part of a laser apparatus in the EUV light generation system according to the comparative example.

FIG. 3 schematically illustrates an exemplary configuration of a main part of the laser apparatus 3 in the EUV light generation system 11A according to the comparative example. FIG. 3 omits illustration of the laser beam transmission device 34 for simplification. Although FIG. 3 illustrates the two amplifiers PA1 and PA2 only, three or more amplifiers may be provided.

The optical isolator 81, the amplifier PA1, high reflection mirrors 96 and 97, and the amplifier PA2 may be sequentially disposed on a laser beam path from the master oscillator 110 to the window 21 of the chamber 2.

The high reflection mirror 96 is held by a holder 98. The high reflection mirror 97 is held by a holder 99.

The laser beam path from the master oscillator 110 to the chamber 2 is substantially entirely covered by the optical path tubes 400. The optical path tubes 400 may cover optical elements included in the laser beam path, such as the optical isolator 81 and the high reflection mirrors 96 and 97.

The optical path tubes 400 may be divided into a plurality of blocks. The optical path tubes 400 include a discharge hole that provides communication with the outside. The discharge hole may be formed by a gap 401 at a part where each block of the optical path tubes 400 is connected with one of the amplifiers PA1 and PA2 and the chamber 2. The discharge hole may be provided not to every block of the optical path tubes 400 but to some blocks. The part where each block of the optical path tubes 400 is connected with one of the amplifiers PA1 and PA2 and the chamber 2 may have one end closed by a window.

The gas supply device 70 supplies the purge gas into the optical path tubes 400 through a main supply path 71A and a plurality of bifurcation supply paths 71B bifurcated from the main supply path 71A. Each block of the optical path tubes 400 is coupled with a pipe forming the corresponding bifurcation supply path 71B.

The laser apparatus 3 may further include a temperature sensor 410 and a temperature measurement controller 52.

The temperature sensor 410 may be provided to, for example, an optical element such as a lens or a mirror disposed on a laser beam path or a holder holding the optical element. The optical elements disposed on the laser beam path may be, for example, the optical isolator 81, the input window 61a and the output window 61b of each of the amplifiers PA1 and PA2, the high reflection mirrors 96 and 97, and the window 21 of the chamber 2. The holders holding the optical elements may be, for example, the holders 98 and 99 holding the high reflection mirrors 96 and 97.

The temperature measurement controller 52 may sense anomalous heating at the optical elements and the holders based on a result of temperature measurement by the temperature sensor 410.

[2.2.2 Operation]

The gas supply device 70 supplies the purge gas into the optical path tubes 400 through the main supply path 71A and the bifurcation supply paths 71B. The gas supply device 70 may be a CDA supply device configured to supply CDA (dry air, clean dry air, or compressed dry air) as the purge gas. The CDA may be dry air managed so that the dew point temperature thereof is −70° C. or lower. The flow rate of the purge gas supplied from the gas supply device 70 may be set to be a flow rate at which the purge gas in each block of the optical path tubes 400 is replaced in, for example, 10 minutes approximately. For example, when the CDA is supplied as the purge gas, the flow rate may be 200 L/min to 300 L/min.

The purge gas supplied from the gas supply device 70 flows through the laser beam path, and is discharged to the outside through the discharge hole. The purpose of the purge gas flow may be to cause clean purge gas to flow through the laser beam path, thereby reducing degradation of any optical element included in the laser beam path due to dew condensation and moisture absorption.

When device anomaly such as damage or shift from the axis of a laser beam has occurred to the optical element such as the optical isolator 81 or the high reflection mirror 96 or 97, the optical element, the holder of the optical element, or the like is heated and the temperature thereof increases. The temperature sensor 410 measures the temperature of the optical element or the holder thereof, and the temperature measurement controller 52 monitors increase of the temperature, thereby finding any device anomaly early. The temperature measurement controller 52 may be connected with the EUV light generation controller 5 and transmit a signal indicating that anomalous heating is sensed to the EUV light generation controller 5. When anomalous heating is sensed by the temperature measurement controller 52, the EUV light generation controller 5 may display an alert on a display unit (not illustrated) and stop the laser apparatus 3.

[2.3 Problem]

In the laser apparatus 3 according to the comparative example in FIG. 3, the temperature sensor 410 can be disposed at an individual optical element or holder to specify an anomalously heated place. However, this may complicate the configurations of the laser apparatus 3 and the EUV light generation system 11A. The laser apparatus 3 and the EUV light generation system 11A typically include several tens of optical elements. Since there are the holders of the optical elements in addition, temperature may need to be measured at several hundreds of places to specify an anomalously heated place. Thus, the laser apparatus 3 according to the comparative example may suffer increase of the sizes of the laser apparatus 3 and the EUV light generation system 11A and complication of the configurations thereof. Further, in relation to the above, when a large number of temperature sensors 410 are installed, time may be taken for disassembly and assembly at maintenance, which degrades maintainability.

Furthermore, the laser apparatus 3 according to the comparative example is less excellent in measurement accuracy and diagnosis correctness. In the laser apparatus 3, heat generation at anomaly occurs at the surface of an optical element or a holder. Surface measurement is easy to perform in a case of a holder, but the surface of an optical element is a laser reflection surface, and thus a measurement instrument or the like cannot be installed on the surface in most cases. Thus, the measurement is performed on the side surface or the back surface of the optical element, but time is needed until surface heat generation is reflected on the side surface or the back surface, which may lead to decrease of the measurement accuracy and the diagnosis correctness.

3. Embodiment 1

Laser Apparatus Having Function of Measuring Discharge Temperature of the Purge Gas The following describes a laser apparatus and an EUV light generation system according to Embodiment 1 of the present disclosure. Hereinafter, any component substantially identical to that of the laser apparatus 3 and the EUV light generation system 11A according to the comparative example described above is denoted by an identical reference sign, and description thereof will be omitted as appropriate.

[3.1 Configuration]

Figure 4:
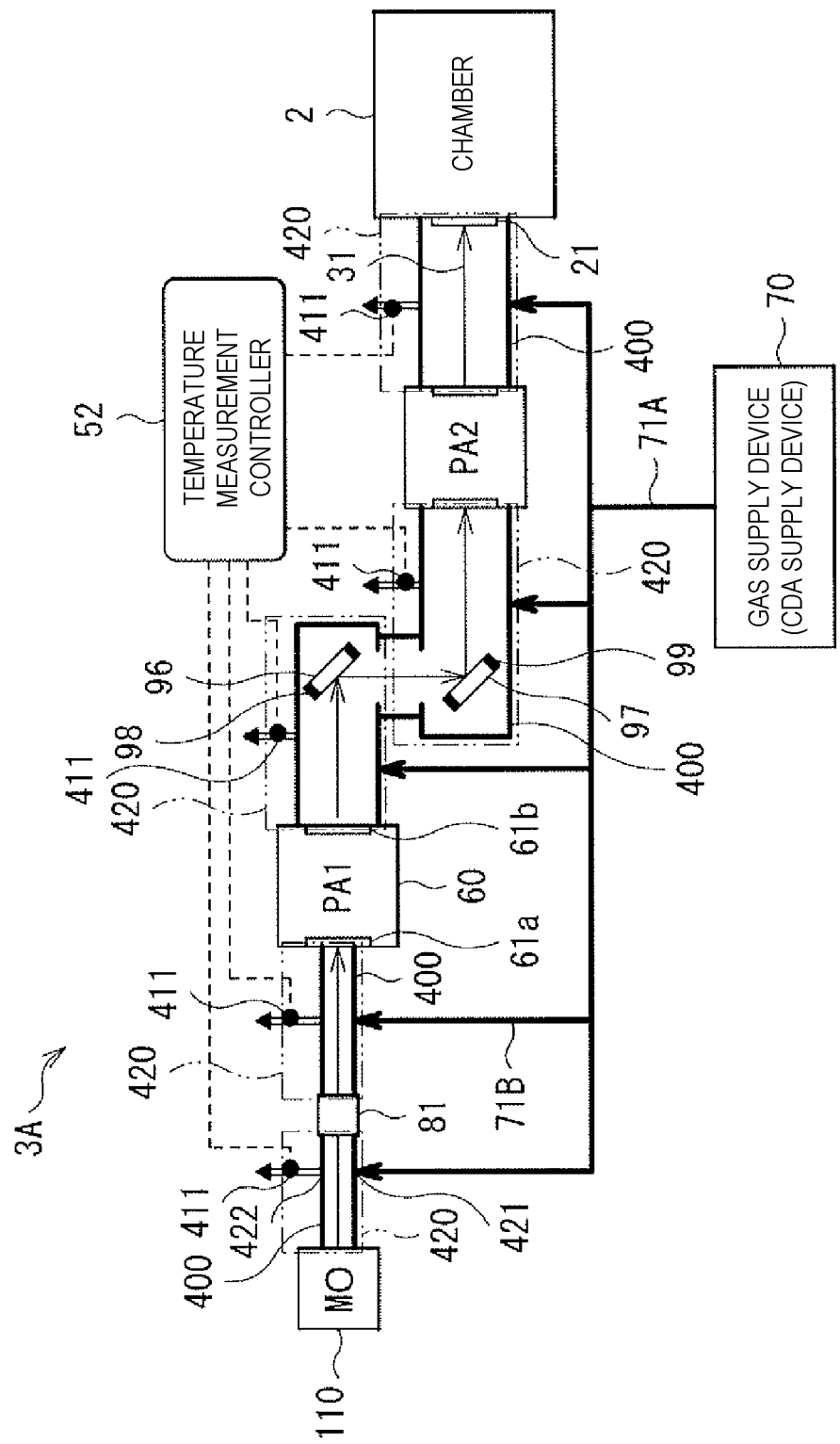
FIG. 4 schematically illustrates an exemplary configuration of a main part of a laser apparatus according to Embodiment 1.

FIG. 4 schematically illustrates an exemplary configuration of a main part of a laser apparatus 3A according to Embodiment 1.

The EUV light generation system according to Embodiment 1 may include the laser apparatus 3A in place of the laser apparatus 3 in the EUV light generation system 11A according to the comparative example described above.

The laser apparatus 3A includes a temperature sensor 411 as a first temperature sensor in place of the temperature sensor 410 in the laser apparatus 3 according to the comparative example described above. The temperature sensor 411 may be a thermocouple.

The laser apparatus 3A includes an envelope body provided surrounding the laser beam path from the master oscillator 110 to the chamber 2. The envelope body may be formed of the optical path tubes 400. The envelope body includes a plurality of envelope blocks 420 provided along the laser beam path. Each envelope block 420 may cover part of the laser beam path from the master oscillator 110 to the chamber 2. The envelope body may include the envelope blocks 420 to cover the laser beam path from the master oscillator 110 to the chamber 2. Each envelope block 420 includes at least one optical element such as the optical isolator 81 or the high reflection mirrors 96 and 97. The gap 401 may be formed at a part where each envelope block 420 of the optical path tubes 400 is connected with one of the amplifiers PA1 and PA2 and the chamber 2 as in the laser apparatus 3 according to the comparative example. In the exemplary configuration in FIG. 4, the gap 401 is not formed.

The optical path tubes 400 include an intake port 421 as an intake unit, and a discharge port 422 as a discharge unit. At least one intake port 421 is provided to each envelope block 420. The intake port 421 in each envelope block 420 is coupled with the corresponding bifurcation supply path 71B to introduce the purge gas from the gas supply device 70 to the inside of the optical path tubes 400 through the main supply path 71A and the bifurcation supply path 71B. At least one discharge port 422 is provided to each envelope block 420 to discharge the purge gas from the inside of the optical path tubes 400.

At least one temperature sensor 411 is provided to each envelope block 420 and separated from the optical elements such as the optical isolator 81 and the high reflection mirrors 96 and 97, the holders 98 and 99, and the like. The temperature sensor 411 may be the first temperature sensor configured to measure a first temperature of gas at a position away from the optical elements. The temperature sensor 411 measures the first temperature of gas at the position also away from the holders 98 and 99 holding the high reflection mirrors 96 and 97, and the like. This gas may include the purge gas. In the laser apparatus 3A, the temperature sensor 411 measures the discharge temperature of the purge gas discharged from the discharge port 422 for each envelope block 420, thereby measuring the first temperature of the atmosphere in the envelope block 420.

The temperature measurement controller 52 may be a control unit connected with each temperature sensor 411 and configured to specify an envelope block 420 at which increase of the discharge temperature is measured in the envelope body as an envelope block 420 at which anomaly is occurring based on a result of measurement by the temperature sensor 411. Alternatively, the temperature measurement controller 52 may be a control unit connected with each temperature sensor 411 and configured to specify an optical path tube 400 at which increase of the discharge temperature is measured in the envelope body as an optical path tube 400 at which anomaly is occurring based on a result of measurement by the temperature sensor 411.

Embodiment 1 describes below an example in which the temperature measurement controller 52 specifies an envelope block 420 at which anomaly is occurring. Similarly, each embodiment to be described later describes an example in which an envelope block 420 at which anomaly is occurring is specified.

The other configuration may be substantially same as that of the laser apparatus 3 and the EUV light generation system 11A according to the comparative example described above.

[3.2 Operation]

The gas supply device 70 supplies the purge gas into each envelope block 420 of the optical path tubes 400 through the main supply path 71A and the bifurcation supply paths 71B coupled with the intake port 421.

The purge gas supplied from the gas supply device 70 flows through the laser beam path in each envelope block 420, and is discharged to the outside of the optical path tubes 400 through each discharge port 422.

When device anomaly such as damage or shift from the axis of a laser beam has occurred to an optical element such as the optical isolator 81 or the high reflection mirror 96 or 97, the optical element, the holder of the optical element, or the like is heated, and the temperature thereof increases. Simultaneously, the gas temperature increases, and thus the anomalous heating can be sensed by measuring, through the temperature sensor 411, the discharge temperature of the purge gas discharged from the discharge port 422.

(First Exemplary Anomalous Heating Sensing Operation)

In the laser apparatus 3A, the discharge temperature as the first temperature is measured by the temperature sensor 411 for each envelope block 420. The temperature measurement controller 52 determines that anomalous heating is occurring at, among the envelope blocks 420 in the envelope body, an envelope block 420 including a temperature sensor 411 having measured the discharge temperature to be equal to or higher than a predetermined threshold.

Figure 5:
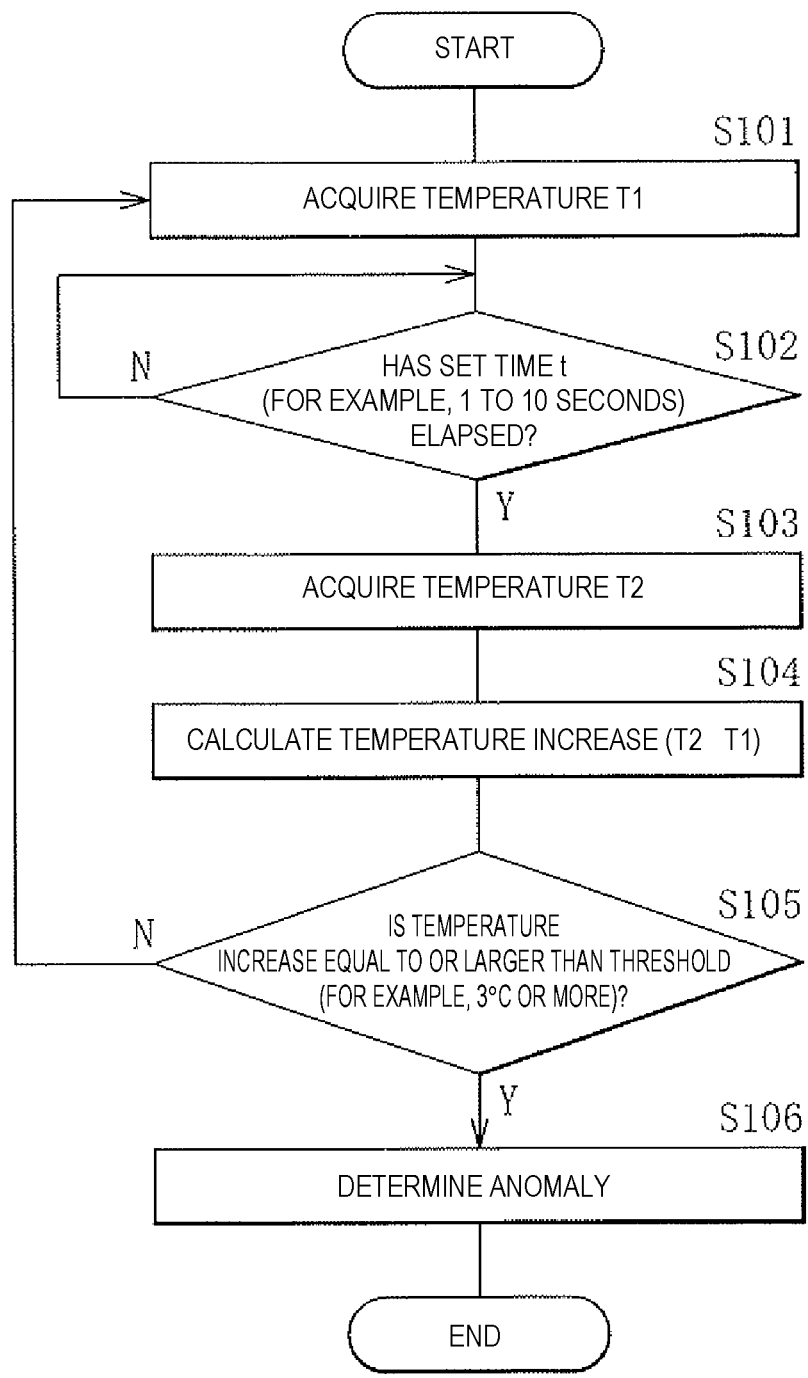
FIG. 5 schematically illustrates the flowchart of a first exemplary anomalous heating sensing operation at the laser apparatus according to Embodiment 1.

FIG. 5 schematically illustrates the flowchart of a first exemplary anomalous heating sensing operation at the laser apparatus 3A. The temperature measurement controller 52 performs the anomalous heating sensing operation described below for each envelope block 420. Accordingly, an envelope block 420 at which anomalous heating is occurring is specified among the envelope blocks 420 in the envelope body.

First, the temperature measurement controller 52 acquires a discharge temperature T1 through the temperature sensor 411 (step S101).

Subsequently, the temperature measurement controller 52 determines whether or not a set time t has elapsed (step S102). The set time t may be, for example, one second to 10 seconds inclusive. When having determined that the set time t has not elapsed (N at step S102), the temperature measurement controller 52 repeats the determination at step S102 until the set time t elapses.

When having determined that the set time t has elapsed (Y at step S102), the temperature measurement controller 52 subsequently acquires a discharge temperature T2 after the elapse of the set time t through the temperature sensor 411 (step S103).

Subsequently, the temperature measurement controller 52 calculates temperature increase through the elapse of the set time t by calculating the temperature difference (T2−T1) between the discharge temperature T2 and the discharge temperature T1 (step S104).

Subsequently, the temperature measurement controller 52 determines whether or not the temperature increase is equal to or larger than a predetermined threshold (step S105). The predetermined threshold may be, for example, 3° C. The predetermined threshold may be changed in accordance with the flow rate of the purge gas supplied from the gas supply device 70. When having determined that the temperature increase is not equal to nor larger than the predetermined threshold (N at step S105), the temperature measurement controller 52 returns to the processing at step S101.

When having determined that the temperature increase is equal to or larger than the predetermined threshold (Y at step S105), the temperature measurement controller 52 determines that anomalous heating is occurring at an envelope block 420 at which the temperature increase is measured (step S106), and ends the processing of the anomalous heating sensing operation.

(Second Exemplary Anomalous Heating Sensing Operation)

In the laser apparatus 3A, the temperature measurement controller 52 may calculate, for example, the change rate of the discharge temperature measured as the first temperature by the temperature sensor 411 for each envelope block 420. Then, the temperature measurement controller 52 may determine that anomalous heating is occurring at, among the envelope blocks 420 in the envelope body, an envelope block 420 including a temperature sensor 411 having measured the change rate of the temperature to be equal to or larger than a predetermined threshold.

Figure 6:
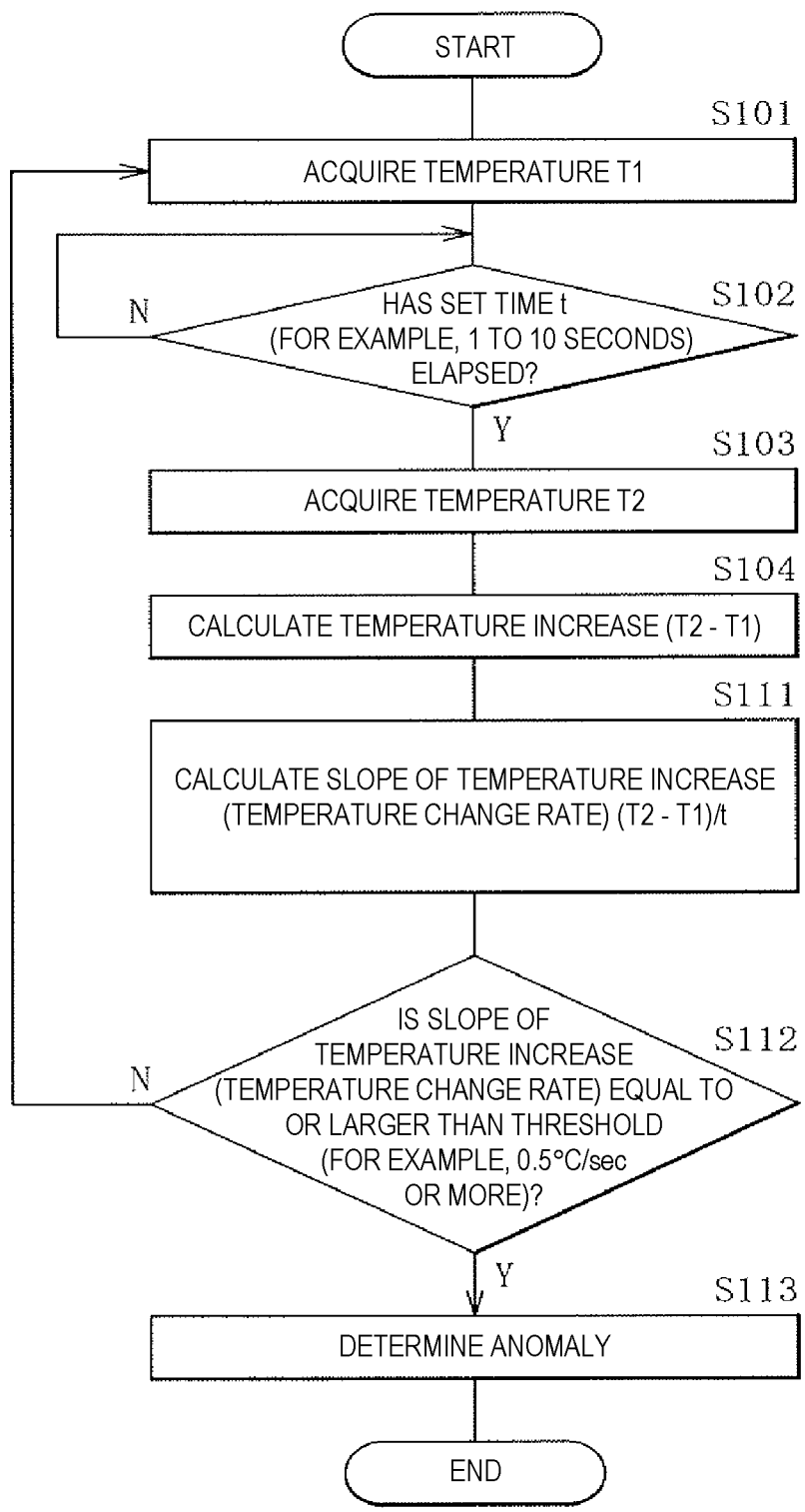
FIG. 6 schematically illustrates the flowchart of a second exemplary anomalous heating sensing operation at the laser apparatus according to Embodiment 1.

FIG. 6 schematically illustrates the flowchart of a second exemplary anomalous heating sensing operation at the laser apparatus 3A. The temperature measurement controller 52 performs the anomalous heating sensing operation described below for each envelope block 420. Accordingly, an envelope block 420 at which anomalous heating is occurring is specified among the envelope blocks 420 in the envelope body.

After having performed operations same as those at steps S101 to S104 in FIG. 5 described above, the temperature measurement controller 52 subsequently calculates the slope (T2−T1)/t of temperature increase through the elapse of the set time t (step S111). In other words, the change rate of the temperature through the elapse of the set time t is calculated.

Subsequently, the temperature measurement controller 52 determines whether or not the slope of the temperature increase is equal to or larger than a predetermined threshold (step S112). The predetermined threshold may be, for example, 0.5° C./sec. The predetermined threshold may be changed in accordance with the flow rate of the purge gas supplied from the gas supply device 70. When having determined that the slope of the temperature increase is not equal to nor larger than the predetermined threshold (N at step S112), the temperature measurement controller 52 returns to the processing at step S101.

When having determined that the slope of the temperature increase is equal to or larger than the predetermined threshold (Y at step S112), the temperature measurement controller 52 determines that anomalous heating is occurring at an envelope block 420 at which the slope of the temperature increase is measured (step S113), and ends the processing of the anomalous heating sensing operation.

When the occurrence of anomalous heating is sensed through the anomalous heating sensing operation in FIG. 5 or 6, the temperature measurement controller 52 may transmit a signal indicating the sensing of anomalous heating to the EUV light generation controller 5. The EUV light generation controller 5 may stop the operation of the laser apparatus 3A by stopping the light emission trigger signal S4 to the laser apparatus 3A. The EUV light generation controller 5 may display, on the display unit (not illustrated), information of an envelope block 420 at which anomaly is specified. Accordingly, the operator may check damage or the like on an optical element in the envelope block 420 at which anomaly is specified. For example, when the optical element is damaged, the operator may replace the damaged optical element.

The other operation may be substantially same as that of the laser apparatus 3 and the EUV light generation system 11A according to the comparative example described above.

[3.3 Effect]

In the laser apparatus 3A according to Embodiment 1, the discharge temperature of the purge gas is measured at the discharge port 422 for each envelope block 420, and an envelope block 420 at which anomalous heating is occurring is specified based on a result of the measurement, which leads to reduction of the number of measurement places. Accordingly, the entire device configuration can be simplified. The laser apparatus 3A according to Embodiment 1 cannot specify damage or the like for each optical element, but can sense anomaly for each envelope block 420, thereby roughly specifying an anomalous place.

In the laser apparatus 3A according to Embodiment 1, at anomaly such as damage of an optical element, the purge gas flows on the surface of the optical element and is directly heated, and the temperature of the purge gas increases. In the laser apparatus 3A according to Embodiment 1, since the temperature of the purge gas is directly measured, the measurement accuracy and the diagnosis correctness can be improved as compared to a case in which the temperature of the surface of the optical element is measured as in the laser apparatus 3 according to the comparative example.

In the laser apparatus 3A according to Embodiment 1, the temperature sensor 410 does not need to be attached to an optical element or the holder thereof unlike the laser apparatus 3 according to the comparative example. In addition, each temperature sensor 411 can be provided at the discharge port 422 outside the optical path tubes 400. This leads to improved maintainability.

[3.4 Modification]

Figure 7:
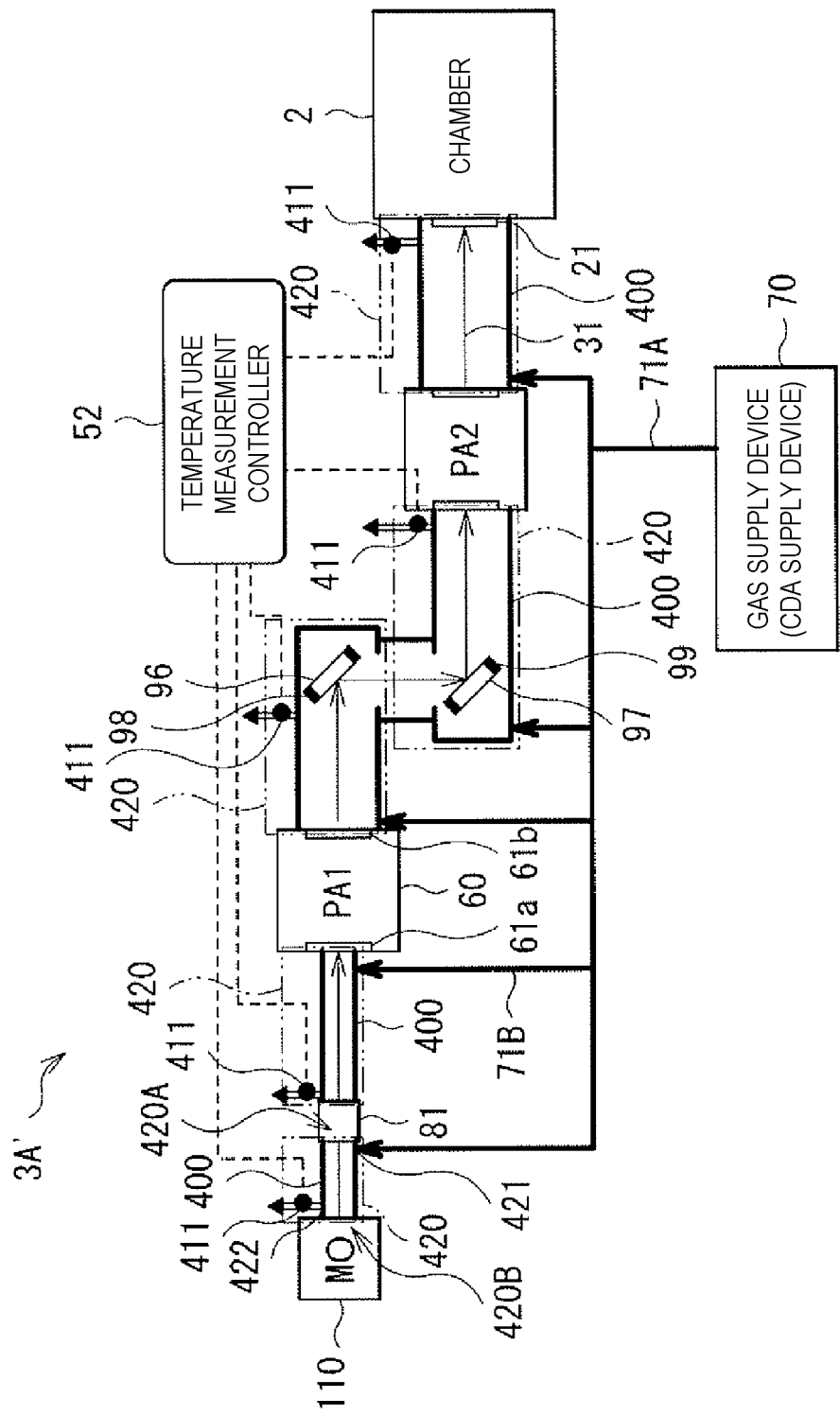
FIG. 7 schematically illustrates an exemplary configuration of a main part of a laser apparatus according to a modification of Embodiment 1.

FIG. 7 schematically illustrates an exemplary configuration of a main part of a laser apparatus 3A' according to a modification of Embodiment 1.

The envelope blocks 420 each include a first block edge 420A and a second block edge 420B.

As illustrated in FIG. 7, in each envelope block 420, the intake port 421 as the intake unit is preferably provided closer to the first block edge 420A, and the discharge port 422 as the discharge unit is preferably provided closer to the second block edge 420B.

With this configuration, accumulation of the purge gas inside the optical path tubes 400 can be reduced in each envelope block 420, which makes it easier to sense anomalous heating of an optical element.

4. Embodiment 2

Laser Apparatus Having Function of Measuring Temperature of Purge Gas Supplied from Gas Supply Device The following describes a laser apparatus and an EUV light generation system according to Embodiment 2 of the present disclosure. Hereinafter, any component substantially identical to that of the laser apparatus and the EUV light generation system according to the comparative example or Embodiment 1 described above is denoted by an identical reference sign, and description thereof will be omitted as appropriate.

[4.1 Configuration]

Figure 8:
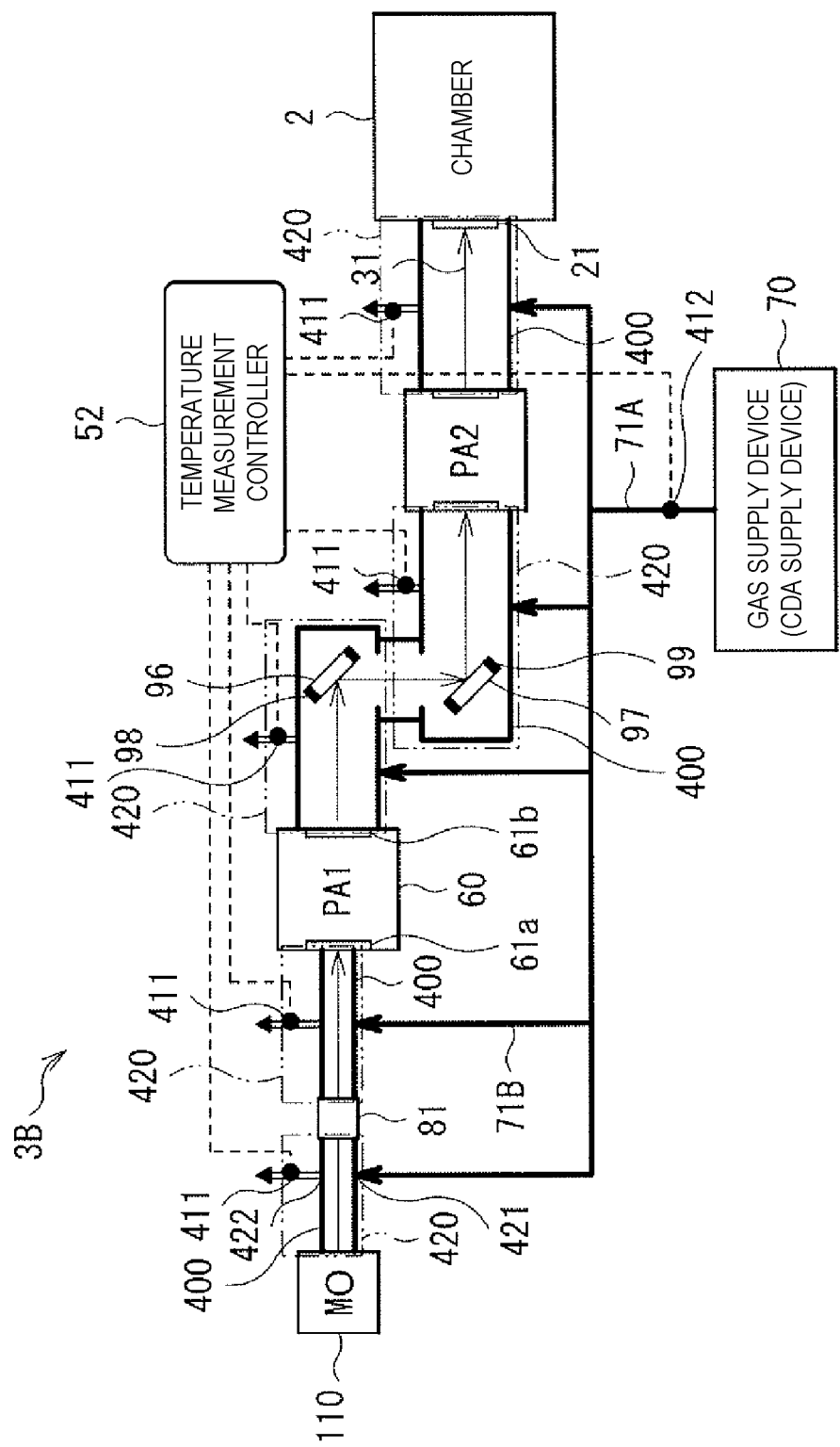
FIG. 8 schematically illustrates the flowchart of a first exemplary anomalous heating sensing operation at a laser apparatus according to Embodiment 2.

FIG. 8 schematically illustrates an exemplary configuration of a main part of a laser apparatus 3B according to Embodiment 2.

The EUV light generation system according to Embodiment 2 may include the laser apparatus 3B in place of the laser apparatus 3 in the EUV light generation system 11A according to the comparative example described above.

The laser apparatus 3B further includes a temperature sensor 412 as a second temperature sensor in addition to the configuration of the laser apparatus 3A according to Embodiment 1. The temperature sensor 412 may be a thermocouple. The temperature sensor 412 is connected with the temperature measurement controller 52.

The temperature sensor 412 is provided to the main supply path 71A of the gas supply device 70 to measure a gas supply temperature as a second temperature of the purge gas supplied from the gas supply device 70.

The temperature measurement controller 52 specifies an envelope block 420 at which anomalous heating is occurring among the envelope blocks 420 in the envelope body based on the temperature difference between the discharge temperature measured as the first temperature by the temperature sensor 411 and the gas supply temperature measured as the second temperature by the temperature sensor 412.

The other configuration may be substantially same as that of the laser apparatus 3A and the EUV light generation system according to the comparative example or Embodiment 1.

[4.2 Operation]

In the laser apparatus 3B, for example, the temperature measurement controller 52 calculates, for each envelope block 420, the temperature difference between the discharge temperature measured by the temperature sensor 411 and the gas supply temperature measured by the temperature sensor 412. Then, the temperature measurement controller 52 determines that anomalous heating is occurring at, among the envelope blocks 420 in the envelope body, an envelope block 420 including a temperature sensor 411 having measured the temperature difference to be equal to or larger than a predetermined threshold. The predetermined threshold may be, for example, 3° C.

Alternatively, for example, the temperature measurement controller 52 may calculate, for each envelope block 420, the change rate of the temperature difference between the discharge temperature measured by the temperature sensor 411 and the gas supply temperature measured by the temperature sensor 412. Then, the temperature measurement controller 52 may determine that anomalous heating is occurring at, among the envelope blocks 420 in the envelope body, an envelope block 420 including a temperature sensor 411 having measured the change rate of the temperature difference to be equal to or larger than a predetermined threshold. The predetermined threshold may be, for example, 0.5° C./sec.

When the occurrence of anomalous heating is sensed, the temperature measurement controller 52 may transmit a signal indicating the sensing of anomalous heating to the EUV light generation controller 5. The EUV light generation controller 5 may stop the operation of the laser apparatus 3B by stopping the light emission trigger signal S4 to the laser apparatus 3B. The EUV light generation controller 5 may display, on the display unit (not illustrated), information of an envelope block 420 at which anomaly is specified. Accordingly, the operator may check damage or the like on an optical element in the envelope block 420 at which anomaly is specified. For example, when the optical element is damaged, the operator may replace the damaged optical element.

The other operation may be substantially same as that of the laser apparatus 3A and the EUV light generation system according to the comparative example or Embodiment 1.

[4.3 Effect]

The laser apparatus 3B according to Embodiment 2 specifies an envelope block 420 at which anomalous heating is occurring based on the temperature difference between the gas supply temperature of the gas supply device 70 and the discharge temperature measured for each envelope block 420, which leads to improved correctness of anomalous heating sensing capability.

The other effect is substantially same as that of the laser apparatus 3A and the EUV light generation system according to Embodiment 1.

5. Embodiment 3

Laser Apparatus Having Function of Measuring Intake Temperature of the Purge Gas The following describes a laser apparatus and an EUV light generation system according to Embodiment 3 of the present disclosure. Hereinafter, any component substantially identical to that of the laser apparatus and the EUV light generation system according to the comparative example or Embodiment 1 or 2 described above is denoted by an identical reference sign, and description thereof will be omitted as appropriate.

[5.1 Configuration]

Figure 9:
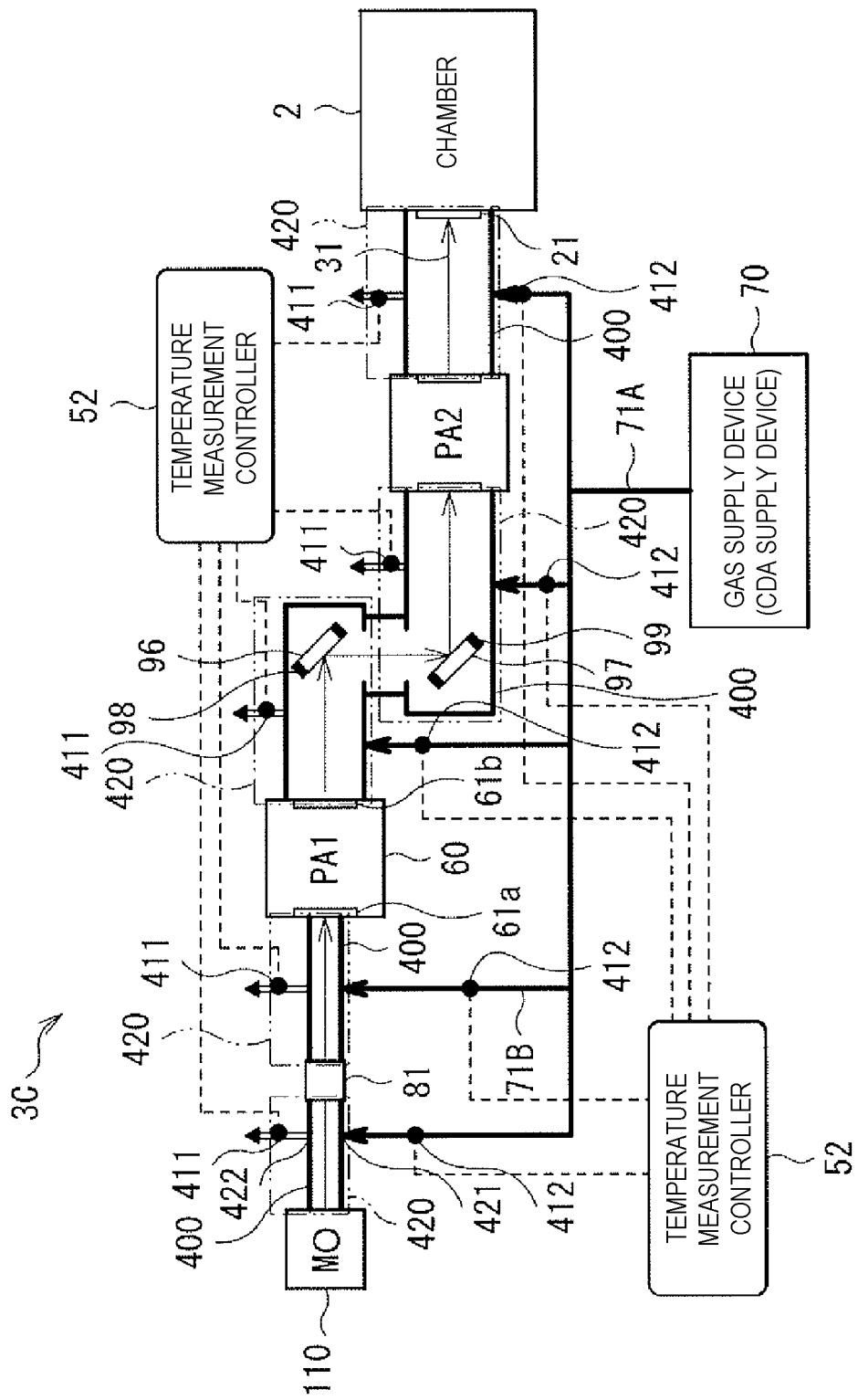
FIG. 9 schematically illustrates an exemplary configuration of a main part of a laser apparatus according to Embodiment 3.

FIG. 9 schematically illustrates an exemplary configuration of a main part of a laser apparatus 3C according to Embodiment 3.

The EUV light generation system according to Embodiment 3 may include the laser apparatus 3C in place of the laser apparatus 3 in the EUV light generation system 11A according to the comparative example described above.

The laser apparatus 3C includes a plurality of temperature sensors 412 each as the second temperature sensor in addition to the configuration of the laser apparatus 3A according to Embodiment 1. Each temperature sensor 412 is connected with the temperature measurement controller 52.

The temperature sensor 412 is provided for each envelope block 420 to measure, as the second temperature, the intake temperature of the purge gas introduced through the intake port 421 as the intake unit.

The temperature measurement controller 52 specifies an envelope block 420 at which anomalous heating is occurring among the envelope blocks 420 in the envelope body based on the temperature difference between the discharge temperature measured as the first temperature by the temperature sensor 411 and the intake temperature measured as the second temperature by the temperature sensor 412.

The other configuration may be substantially same as that of the laser apparatus 3A and the EUV light generation system according to the comparative example or Embodiment 1.

[5.2 Operation]

(First Exemplary Anomalous Heating Sensing Operation)

In the laser apparatus 3C, for example, the temperature measurement controller 52 calculates, for each envelope block 420, the temperature difference between the discharge temperature measured as the first temperature by the temperature sensor 411 and the intake temperature measured as the second temperature by the temperature sensor 412. The temperature measurement controller 52 determines that anomalous heating is occurring at, among the envelope blocks 420 in the envelope body, an envelope block 420 including a temperature sensor 411 having measured the temperature difference to be equal to or larger than a predetermined threshold.

Figure 10:
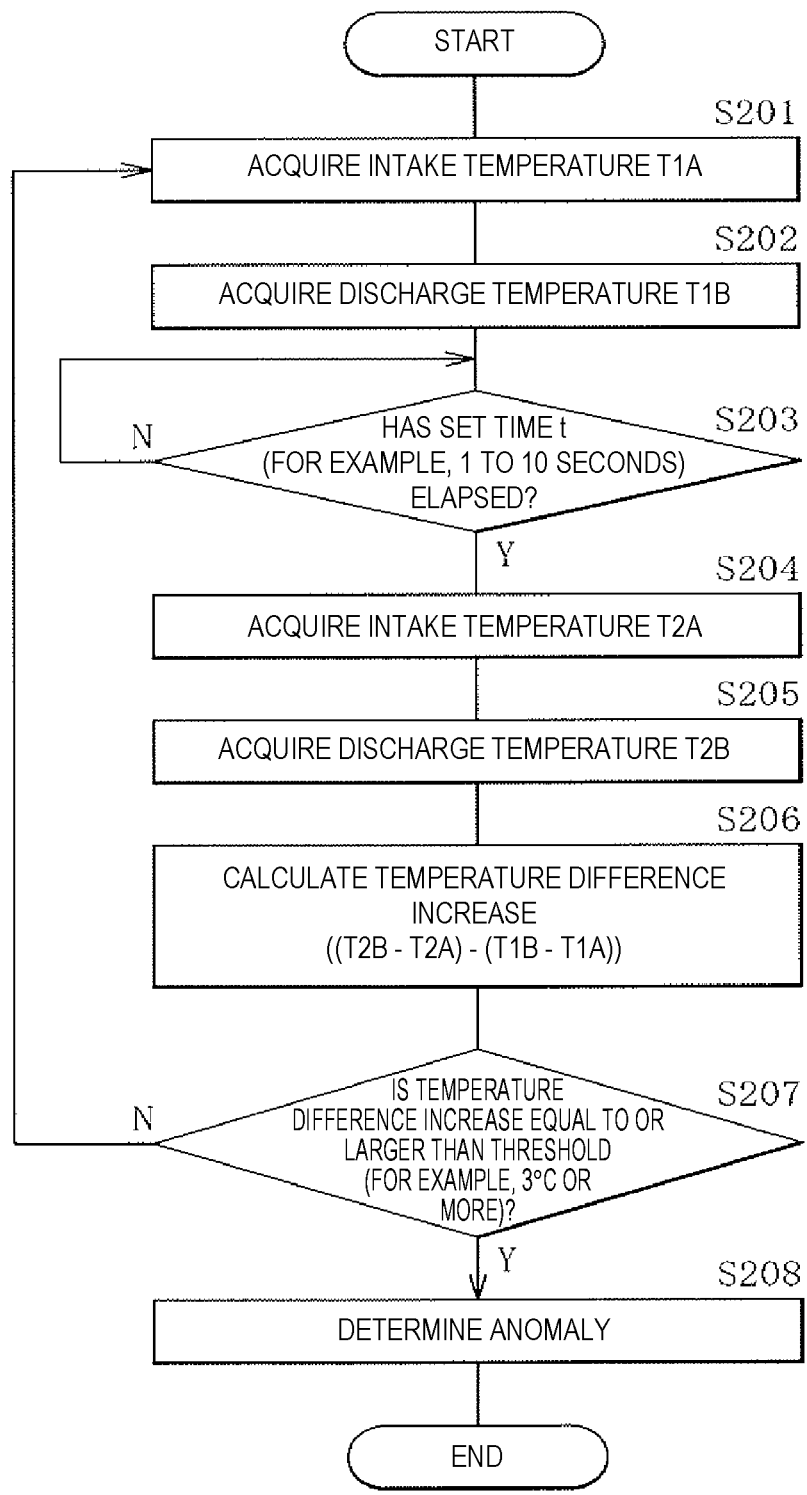
FIG. 10 schematically illustrates the flowchart of a first exemplary anomalous heating sensing operation at the laser apparatus according to Embodiment 3.

FIG. 10 schematically illustrates the flowchart of a first exemplary anomalous heating sensing operation at the laser apparatus 3C. The temperature measurement controller 52 performs the anomalous heating sensing operation described below for each envelope block 420. Accordingly, an envelope block 420 at which anomalous heating is occurring is specified among the envelope blocks 420 in the envelope body.

First, the temperature measurement controller 52 acquires an intake temperature T1A through the temperature sensor 412 (step S201). Subsequently, the temperature measurement controller 52 acquires a discharge temperature T1B through the temperature sensor 411 (step S202).

Subsequently, the temperature measurement controller 52 determines whether or not a set time t has elapsed (step S203). The set time t may be, for example, one second to 10 seconds inclusive. When having determined that the set time t has not elapsed (N at step S203), the temperature measurement controller 52 repeats the determination at step S203 until the set time t elapses.

When having determined that the set time t has elapsed (Y at step S203), the temperature measurement controller 52 subsequently acquires an intake temperature T2A after the elapse of the set time t through the temperature sensor 412 (step S204). Subsequently, the temperature measurement controller 52 acquires a discharge temperature T2B after the elapse of the set time t through the temperature sensor 411 (step S205).

Subsequently, the temperature measurement controller 52 calculates the temperature difference (T1B−T1A) between the discharge temperature T1B and the intake temperature T1A. The temperature measurement controller 52 also calculates the temperature difference (T2B−T2A) between the discharge temperature T2B and the intake temperature T2A. Subsequently, the temperature measurement controller 52 calculates increase of the temperature difference through the elapse of the set time t by an equation below (step S206).

$$\text{Increase of the temperature difference} = ((T2B-T2A)-(T1B-T1A))$$

Subsequently, the temperature measurement controller 52 determines whether or not the increase of the temperature difference is equal to or larger than a predetermined threshold (step S207). The predetermined threshold may be, for example, 3° C. The predetermined threshold may be changed in accordance with the flow rate of the purge gas supplied from the gas supply device 70. When having determined that the increase of the temperature difference is not equal to nor larger than the predetermined threshold (N at step S207), the temperature measurement controller 52 returns to the processing at step S201.

When having determined that the increase of the temperature difference is equal to or larger than the predetermined threshold (Y at step S207), the temperature measurement controller 52 determines that anomalous heating is occurring at an envelope block 420 at which the increase of the temperature difference is measured (step S208), and ends the processing of the anomalous heating sensing operation.

(Second Exemplary Anomalous Heating Sensing Operation)

In the laser apparatus 3C, for example, the temperature measurement controller 52 may calculate, for each envelope block 420, the change rate of the temperature difference between the discharge temperature measured as the first temperature by the temperature sensor 411 and the intake temperature measured as the second temperature by the temperature sensor 412. Then, the temperature measurement controller 52 may determine that anomalous heating is occurring at, among the envelope blocks 420 in the envelope body, an envelope block 420 including a temperature sensor 411 having measured the change rate of the temperature difference to be equal to or larger than a predetermined threshold.

Figure 11:
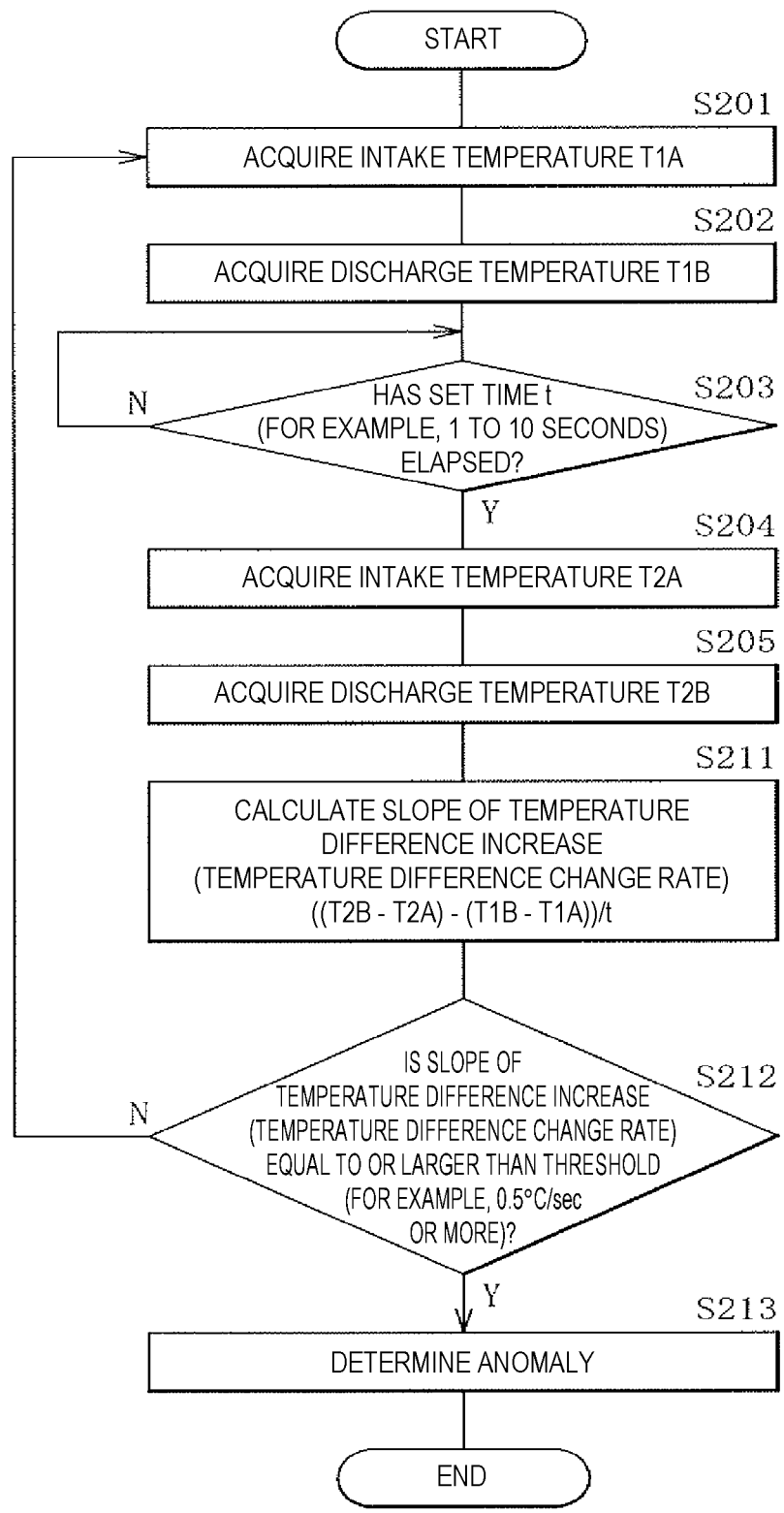
FIG. 11 schematically illustrates the flowchart of a second exemplary anomalous heating sensing operation at the laser apparatus according to Embodiment 3.

FIG. 11 schematically illustrates the flowchart of a second exemplary anomalous heating sensing operation at the laser apparatus 3C. The temperature measurement controller 52 performs the anomalous heating sensing operation described below for each envelope block 420. Accordingly, an envelope block 420 at which anomalous heating is occurring is specified among the envelope blocks 420 in the envelope body.

After having performed operations same as those at steps S201 to S205 in FIG. 10 described above, the temperature measurement controller 52 subsequently calculates the temperature difference (T1B−T1A) between the discharge temperature T1B and the intake temperature T1A. The temperature measurement controller 52 also calculates the temperature difference (T2B−T2A) between the discharge temperature T2B and the intake temperature T2A. Subsequently, the temperature measurement controller 52 calculates the slope of increase of the temperature difference through the elapse of the set time t by an equation below (step S211). In other words, the change rate of increase of the temperature difference through the elapse of the set time t is calculated.

Slope of increase of the temperature difference=
$((T2B-T2A)-(T1B-T1A))/t$

Subsequently, the temperature measurement controller 52 determines whether or not the slope of increase of the temperature difference is equal to or larger than a predetermined threshold (step S212). The predetermined threshold may be, for example, 0.5° C./sec. The predetermined threshold may be changed in accordance with the flow rate of the purge gas supplied from the gas supply device 70. When having determined that the slope of increase of the temperature difference is not equal to nor larger than the predetermined threshold (N at step S212), the temperature measurement controller 52 returns to the processing at step S201.

When having determined that the slope of increase of the temperature difference is equal to or larger than the predetermined threshold (Y at step S212), the temperature measurement controller 52 determines that anomalous heating is occurring at an envelope block 420 at which the slope of increase of the temperature difference is measured (step S213), and ends the processing of the anomalous heating sensing operation.

When the occurrence of anomalous heating is sensed through the anomalous heating sensing operation in FIG. 10 or 11, the temperature measurement controller 52 may transmit a signal indicating the sensing of anomalous heating to the EUV light generation controller 5. The EUV light generation controller 5 may stop the operation of the laser apparatus 3C by stopping the light emission trigger signal S4 to the laser apparatus 3C. The EUV light generation controller 5 may display, on the display unit (not illustrated), information of an envelope block 420 at which anomaly is specified. Accordingly, the operator may check damage or the like on an optical element in the envelope block 420 at which anomaly is specified. For example, when the optical element is damaged, the operator may replace the damaged optical element.

The other operation may be substantially same as that of the laser apparatus 3A and the EUV light generation system according to the comparative example or Embodiment 1.

[5.3 Effect]

The laser apparatus 3C according to Embodiment 3 measures the intake temperature and the discharge temperature for each envelope block 420 and specifies an envelope block 420 at which anomalous heating is occurring based on the temperature difference therebetween, which leads to further improved correctness of anomalous heating sensing capability.

The other effect is substantially same as that of the laser apparatus 3A and the EUV light generation system according to Embodiment 1.

6. Embodiment 4

Laser Apparatus Having Function of Measuring Discharge Temperature of Purge Gas at Optical Path Tube Gap The following describes a laser apparatus and an EUV light generation system according to Embodiment 4 of the present disclosure. Hereinafter, any component substantially identical to that of the laser apparatus and the EUV light generation system according to any one of the comparative example and Embodiments 1 to 3 described above is denoted by an identical reference sign, and description thereof will be omitted as appropriate.

[6.1 Configuration]

Figure 12:
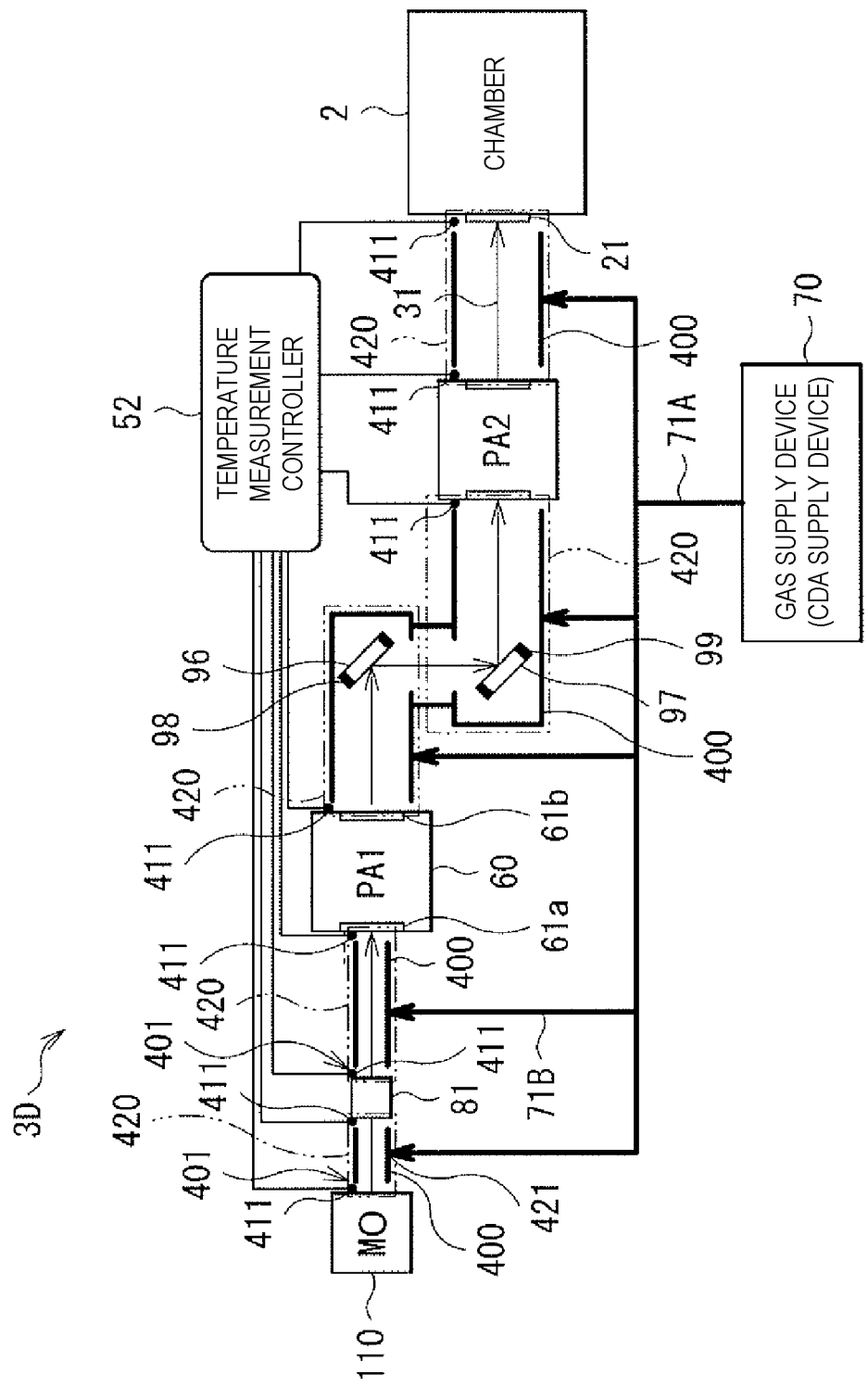
FIG. 12 schematically illustrates an exemplary configuration of a main part of a laser apparatus according to Embodiment 4.

FIG. 12 schematically illustrates an exemplary configuration of a main part of a laser apparatus 3D according to Embodiment 4.

The EUV light generation system according to Embodiment 4 may include a laser apparatus 3D in place of the laser apparatus 3 in the EUV light generation system 11A according to the comparative example described above.

In the laser apparatus 3D, similarly to the laser apparatus 3 according to the comparative example, the gap 401 is formed at the part where each envelope block 420 of the optical path tubes 400 is connected with one of the amplifiers PA1 and PA2 and the chamber 2. For each envelope block 420, the purge gas is discharged through the gap 401 of the optical path tubes 400. Although the laser apparatus 3A according to Embodiment 1 includes the discharge port 422 as the discharge unit, the gap 401 functions as the discharge unit in the laser apparatus 3D. At least one gap 401 is provided to each envelope block 420.

In the laser apparatus 3D, the temperature sensor 411 is provided to at least one gap 401 of each envelope block 420. In the laser apparatus 3D, the temperature sensor 411 measures the discharge temperature of the purge gas discharged through the gap 401 for each envelope block 420, thereby measuring the first temperature of the atmosphere in the envelope block 420.

The other configuration may be substantially same as that of the laser apparatus 3A and the EUV light generation system according to the comparative example or Embodiment 1.

[6.2 Operation]

In the laser apparatus 3D, for each envelope block 420, the purge gas is discharged through the gap 401 of the optical path tubes 400. For each envelope block 420, the temperature sensor 411 measures the discharge temperature of the purge gas discharged from the gap 401 of the optical path tubes 400.

Anomalous heating sensing operations at the laser apparatus 3D may be substantially same as that of the laser apparatus 3A according to Embodiment 1. For example, the laser apparatus 3D may perform the processing of the anomalous heating sensing operation illustrated in FIG. 5 or 6.

The other operation may be substantially same as that of the laser apparatus 3A and the EUV light generation system according to Embodiment 1.

[6.3 Effect]

In the laser apparatus 3D according to Embodiment 4, no discharge port 422 needs to be provided, and thus the structure of the laser apparatus 3D can be further simplified as compared to that of the laser apparatus 3A according to Embodiment 1.

The other effect is substantially same as that of the laser apparatus 3A and the EUV light generation system according to Embodiment 1.

7. Embodiment 5

Laser Apparatus Having Function of Measuring Temperature of Purge Gas Inside Optical Path Tube The following describes a laser apparatus and an EUV light generation system according to Embodiment 5 of the present disclosure. Hereinafter, any component substantially identical to that of the laser apparatus and the EUV light generation system according to any one of the comparative example and Embodiments 1 to 4 described above is denoted by an identical reference sign, and description thereof will be omitted as appropriate.

[7.1 Configuration]

Figure 13:
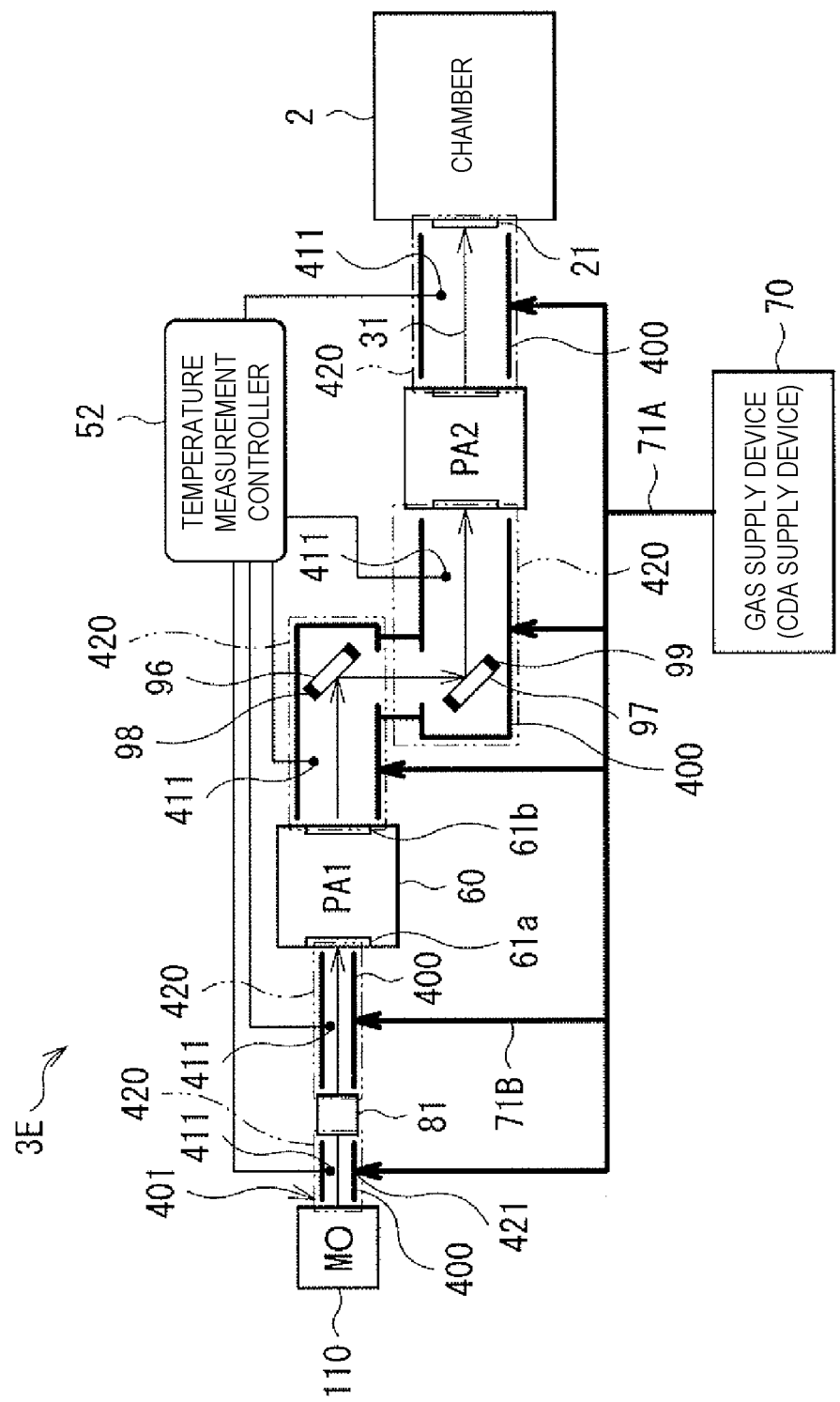
FIG. 13 schematically illustrates an exemplary configuration of a main part of a laser apparatus according to Embodiment 5.

FIG. 13 schematically illustrates an exemplary configuration of a main part of a laser apparatus 3E according to Embodiment 5.

The EUV light generation system according to Embodiment 5 may include the laser apparatus 3E in place of the laser apparatus 3 in the EUV light generation system 11A according to the comparative example described above.

In the laser apparatus 3E, similarly to the laser apparatus 3 according to the comparative example, the gap 401 is formed at the part where each envelope block 420 of the optical path tubes 400 is connected with one of the amplifiers PA1 and PA2 and the chamber 2. For each envelope block 420, the purge gas is discharged through the gap 401 of the optical path tubes 400. Although the laser apparatus 3A according to Embodiment 1 includes the discharge port 422 as the discharge unit, the gap 401 functions as the discharge unit in the laser apparatus 3E. At least one gap 401 is provided to each envelope block 420.

In the laser apparatus 3E, at least one temperature sensor 411 is provided to each envelope block 420 inside the optical path tubes 400. The temperature sensor 411 is separated from the optical elements such as the optical isolator 81 and the high reflection mirrors 96 and 97 inside the optical path tubes 400.

In the laser apparatus 3E, the temperature sensor 411 measures, for each envelope block 420, the temperature of the purge gas at a position away from an optical element inside the optical path tubes 400.

The other configuration may be substantially same as that of the laser apparatus 3A and the EUV light generation system according to the comparative example or Embodiment 1.

[7.2 Operation and Effect]

Anomalous heating sensing operations at the laser apparatus 3E may be substantially same as that of the laser apparatus 3A according to Embodiment 1. For example, the laser apparatus 3E may perform the processing of the anomalous heating sensing operation illustrated in FIG. 5 or 6.

The other operation and effect are substantially same as those of the laser apparatus 3A and the EUV light generation system according to Embodiment 1.

8. Others

The above description is intended to provide not restriction but examples. Thus, the skilled person in the art would clearly understand that the embodiments of the present disclosure may be changed without departing from the scope of the claims.

The terms used throughout the specification and the appended claims should be interpreted as "non-limiting". For example, the term "comprising" or "comprised" should be interpreted as "not limited to what has been described as being comprised". The term "having" should be interpreted as "not limited to what has been described as having". It should be understood that the indefinite article "a" in the present specification and the claims means "at least one" or "one or more".

What is claimed is:

1. A laser apparatus comprising:
a plurality of envelope blocks each provided with an optical element and a first temperature sensor and covering part of a laser beam path, the optical element being disposed on the laser beam path, the first temperature sensor being configured to measure a first temperature of gas at a position away from the optical element;
an envelope body including the envelope blocks and covering the laser beam path; and
a control unit connected with each first temperature sensor and configured to specify an envelope block at which increase of the first temperature is measured in the envelope body as an envelope block at which anomaly is occurring, wherein
the gas includes purge gas, and the envelope body includes an intake unit provided to each envelope block and configured to introduce the purge gas to inside of the envelope body, and
a discharge unit provided to each envelope block and configured to discharge the purge gas from inside of the envelope body.

2. The laser apparatus according to claim 1, wherein
the control unit determines that anomaly is occurring at an envelope block including a first temperature sensor having measured the first temperature to be equal to or higher than a predetermined threshold in the envelope body.

3. The laser apparatus according to claim 1, wherein
the control unit determines that anomaly is occurring at an envelope block including a first temperature sensor having measured the change rate of the first temperature to be equal to or larger than a predetermined threshold in the envelope body.

4. The laser apparatus according to claim 1, wherein the first temperature sensor of each envelope block measures a first temperature of the purge gas discharged from the discharge unit.

5. The laser apparatus according to claim 4, further comprising:
a gas supply device configured to supply the purge gas into the envelope body through a main supply path and a bifurcation supply path bifurcated from the main supply path and coupled with the intake unit; and
a second temperature sensor provided to the main supply path, configured to measure a second temperature of the purge gas supplied from the gas supply device, and connected with the control unit, wherein
the control unit specifies an envelope block at which anomaly is occurring in the envelope body based on a temperature difference between the first and second temperatures thus measured.

6. The laser apparatus according to claim 5, wherein the control unit determines that anomaly is occurring at an envelope block including a first temperature sensor having measured temperature difference between the first and second temperatures to be equal to or larger than a predetermined threshold in the envelope body.

7. The laser apparatus according to claim 5, wherein the control unit determines that anomaly is occurring at an envelope block including a first temperature sensor having measured the change rate of the temperature difference between the first and second temperatures to be equal to or larger than a predetermined threshold in the envelope body.

8. The laser apparatus according to claim 4, further comprising
a second temperature sensor provided to each envelope block, configured to measure a second temperature of the purge gas introduced through the intake unit, and connected with the control unit, wherein
the control unit specifies an envelope block at which anomaly is occurring in the envelope body based on a temperature difference between the first and second temperatures thus measured.

9. The laser apparatus according to claim 8, wherein the control unit determines that anomaly is occurring at an envelope block including a first temperature sensor having measured the temperature difference between the first and second temperatures to be equal to or larger than a predetermined threshold in the envelope body.

10. The laser apparatus according to claim 8, wherein the control unit determines that anomaly is occurring at an envelope block including a first temperature sensor having measured the change rate of the temperature difference between the first and second temperatures to be equal to or larger than a predetermined threshold in the envelope body.

11. The laser apparatus according to claim 1, wherein the envelope blocks each include a first block edge and a second block edge,
the intake unit is provided closer to the first block edge in each envelope block, and
the discharge unit is provided closer to the second block edge in each envelope block.

12. The laser apparatus according to claim 1, further comprising
a holder holding at least one of the optical elements, wherein
the first temperature sensor measures the first temperature of gas at the position also away from the holder.

13. The laser apparatus according to claim 1, wherein each first temperature sensor is provided inside the envelope block.

14. An EUV light generation system comprising:
an EUV chamber in which EUV light is generated; and
a laser apparatus configured to emit a laser beam toward the EUV chamber,
the laser apparatus including a plurality of envelope blocks each provided with an optical element and a first temperature sensor and covering part of a laser beam path, the optical element being disposed on the laser beam path, the first temperature sensor being configured to measure a first temperature of gas at a position away from the optical element,
an envelope body including the envelope blocks and covering the laser beam path, and
a control unit connected with each first temperature sensor and configured to specify an envelope block at which increase of the first temperature is measured in the envelope body as an envelope block at which anomaly is occurring, wherein
the gas includes purge gas, and the envelope body includes an intake unit provided to each envelope block and configured to introduce the purge gas to inside of the envelope body, and
a discharge unit provided to each envelope block and configured to discharge the purge gas from inside of the envelope body.

15. A laser apparatus comprising:
an optical element disposed on a laser beam path;
a plurality of optical path tubes each covering the optical element and including an intake unit configured to introduce purge gas to inside of the optical path tube,
a discharge unit configured to discharge the purge gas from inside of the optical path tube, and a first temperature sensor configured to measure a first temperature of the purge gas discharged from the discharge unit;
an envelope body covering the laser beam path with the optical path tubes; and
a control unit connected with each first temperature sensor and configured to specify an optical path tube in which increase of the first temperature is measured in the envelope body as an optical path tube in which anomaly is occurring.

* * * * *